US006636831B1

United States Patent
Profit, Jr. et al.

(10) Patent No.: US 6,636,831 B1
(45) Date of Patent: Oct. 21, 2003

(54) SYSTEM AND PROCESS FOR VOICE-CONTROLLED INFORMATION RETRIEVAL

(75) Inventors: Jack H. Profit, Jr., Vashon Island, WA (US); N. Gregg Brown, Seattle, WA (US); Peter S. Mezey, Seattle, WA (US); Lianne M. Colombo, Seattle, WA (US)

(73) Assignee: Inroad, Inc., Seattle, WA (US)

( * ) Notice: Subject to any disclaimer, the term of this patent is extended or adjusted under 35 U.S.C. 154(b) by 0 days.

(21) Appl. No.: 09/289,784

(22) Filed: Apr. 9, 1999

(51) Int. Cl.[7] ............................................. G10L 21/06
(52) U.S. Cl. ................................... 704/275; 704/270
(58) Field of Search ................................ 704/270, 275, 704/271; 379/88.01; 370/352

(56) References Cited

U.S. PATENT DOCUMENTS

| 5,884,262 A | | 3/1999 | Wise et al. | |
| 6,157,705 A | * | 12/2000 | Perrone | 379/88.01 |
| 6,418,199 B1 | * | 7/2002 | Perrone | 379/88.01 |
| 6,445,694 B1 | * | 9/2002 | Swartz | 370/352 |

FOREIGN PATENT DOCUMENTS

WO    WO 98/37688    2/1997

OTHER PUBLICATIONS

*VoxML 1.0 Language Reference*, Motorola, Inc., Consumer Applications and Services Division, Naperville, IL, Revision 1.0, Sep. 1998, pp. 1–50.
*Motorola's VoxML™ Voice Markup Language*, Draft 3, 1998, 4 pages.

* cited by examiner

*Primary Examiner*—Susan McFadden
(74) *Attorney, Agent, or Firm*—Christensen O'Connor Johnson Kindness PLLC

(57) ABSTRACT

A system and process for voice-controlled information retrieval. A conversation template is executed. The conversation template includes a script of tagged instructions including voice prompts and information content. A voice command identifying information content to be retrieved is processed. A remote method invocation is sent requesting the identified information content to an applet process associated with a Web browser. The information content is retrieved on the Web browser responsive to the remote method invocation.

38 Claims, 18 Drawing Sheets

SYSTEM AND PROCESS FOR VOICE-CONTROLLED INFORMATION RETRIEVAL

NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates in general to voice-controlled devices and, in particular, to systems and processes for voice-controlled information retrieval.

BACKGROUND OF THE INVENTION

There is a continuing challenge in providing access to computational resources to mobile workers. A "mobile worker" performs job duties that require constant physical movement or manual labor, such as performed by a traditional blue-collar worker. Mobile workers typically use their hands in performing their work and do not work at a desk in a traditional office-type setting.

Personal computers and terminals fail to adequately provide computer access to the mobile worker for at least two reasons. First, personal computers and terminals are stationary devices. As a result, mobile workers are forced to alter their work patterns to allow for physical access centered on the stationary personal computer or terminal. Second, personal computers and terminals typically include a display and a keyboard or other tactile input device. Thus, mobile workers must take their eyes off their work to view the display and use their hands to operate the tactile input device. These changes in work patterns are not always practical.

Enterprise resource planning (ERP) systems are one type of computer resource particularly well suited for use by mobile workers. These systems provide an integrated solution by combining traditionally stand-alone legacy systems, such as human resources, sales, marketing and other functionally separate areas, into a unified package. Two companies active in the development of ERP solutions are PeopleSoft and SAP AG.

Moreover, the use of ERP systems opens up a wide range of new possible uses for information stored in corporate databases. For example, previously unavailable engineering plans, such as blueprints, can be made available to assembly line workers. Similarly, an inventory system can be updated on the fly by a packing clerk who works in the shipping department to reflect a change in the inventory of available goods.

Present mobile computing systems suffer from limited available bandwidth with which to send and receive data. This poses a problem with providing mobile workers with access to ERP information. Mobile workers require continuous access to corporate data. The use of visual-based browsers, by way of example, typically require high bandwidth capabilities which are not typically available on mobile computing devices. A speech-based approach is needed.

A prior art, speech only approach to providing voice-controlled access to information retrieval can be found in telephony interactive menu systems or so-called "voice response systems." These systems are generally used by voice activated menu systems which provide a spoken menu of selections to a user over a telephone. The user indicates an appropriate response, generally corresponding to a number on the telephone keypad. The response can be spoken or keyed into the keypad. Such systems limit responses to a finite set of numeric potential choices. Such systems are further limited in the complexity of any given menu option which generally must be short and easily understandable to be effective.

A prior art, visual/speech approach to providing hands free access to information retrieval is a speech-enabled Web browser, such as described in the commonly assigned U.S. patent application Ser. No. 09/272,892, entitled "Voice-Controlled Web Browser," pending, filed Mar. 19, 1999, the disclosure of which is incorporated herein by reference. Such speech-enabled Web browsers augment a standard user interface with a microphone and speaker. Hyperlinks are presented visually to the user who responds by voice using the hyperlink's text, or using a visual hint to make a selection. However, the visual nature of the information content itself inherently limits the flexibility of this approach. The voice prompts are driven by the linear arrangement of the Web content which is designed primarily for visual display and is not formatted for access by a speech-enabled browser. Consequently, complex information is not always easily accessible through speech-enabled Web browsers.

Consequently, there is a need for providing mobile workers with voice-controlled access to computer retrievable information without requiring the mobile worker to alter a work pattern through the use of a stationary personal computer or terminal which requires a display and manual tactile input. Such a solution would preferably be mobile in nature, that is, easily wearable or holdable by the mobile worker and operable without the need for a visual display. Alternately, such a solution could be embodied on a conventional client computer or on telephony devices.

SUMMARY OF THE INVENTION

The present invention provides an approach to voice-controlled information retrieval in which information, such as dynamically generated corporate data, can be presented to a mobile worker using a low bandwidth, speech-oriented connection. The approach includes the capability to present closely related, but mostly static, visual information or other high bandwidth information to a mobile worker using a portable or stationary, but locally situated, Web server. The visual information can optionally be displayed on a Web browser running on another client.

One embodiment of the present invention is a system, process and storage medium for voice-controlled information retrieval using a voice transceiver. A voice transceiver executes a conversation template. The conversation template comprises a script of tagged instructions comprising voice prompts and expected user responses. A speech engine processes a voice command identifying information content to be retrieved. The voice transceiver sends a remote method invocation requesting the identified information content to an applet process associated with a Web browser. An applet method retrieves the identified information content on the Web browser responsive to the remote method invocation.

A further embodiment of the present invention is a system, process and storage medium for retrieving Web content onto a browser running on a remote client using a voice transceiver. A storage device stores a conversation template on the server. The conversation template comprises a script including instruction tags for voice commands and voice prompts. A voice transceiver receives the conversation template. A parser parses the instruction tags from the script to form a set of interrelated tokens and instantiates an object corresponding to each token. An interpreter interprets the set of tokens by executing the object instance corresponding to each token. A speech engine receives a voice command on the voice transceiver from a user for Web content. A remote client is interconnected to the server and the voice transceiver via a network. The voice transceiver sends a remote method invocation identifying the Web content. The remote client includes an applet associated with a browser running on the remote client and requests the Web content from the server responsive to the remote method invocation. The browser receives the Web content.

A further embodiment of the present invention is a process and language definition embodied as code stored on a computer-readable storage medium for facilitating speech driven information processing using a voice transceiver. A speech markup document for speech operations interpretable by the voice transceiver is defined. The markup document comprises a set of tags with each such tag comprising a speech instruction and at least one such tag further comprising a remote procedure call. An applet object for information processing operations interpretable by a client interconnected to the voice transceiver is defined. The applet object comprises a remote procedure call interface responsive to the remote procedure call of the speech markup document and a method defining an operation performable by the browser corresponding to the speech instruction of the at least one such tag.

A further embodiment of the present invention is an integrated system for retrieving Web content using a voice transceiver. An integrated server comprises an enterprise resource planning system and a server suite which cooperatively provide enterprise information formatted as Web content. A storage device stores a conversation template on the server. The conversation template comprises a script including instruction tags for voice commands and voice prompts. A voice transceiver receives the conversation template. The voice transceiver includes a parser, an interpreter and a speech engine. The parser parses the instruction tags from the script to form a set of interrelated tokens and instantiates an object corresponding to each token. The interpreter interprets the set of tokens by executing the object instance corresponding to each token. The speech engine receives a voice command on the voice transceiver from a user for Web content. The voice transceiver requests the Web content from the integrated server responsive to the voice command and the voice transceiver presents the Web content to the user upon the receipt thereof from the server.

A further embodiment of the present invention is an integrated server for retrieving Web content onto a browser running on a remote client using a telephone. A storage device stores a conversation template which comprises a script including instruction tags for voice commands and voice prompts. Middleware and a server suite cooperatively provide enterprise information received from a legacy system formatted as Web content. A voice transceiver receives the conversation template and includes a parser and an interpreter. The parser parses the instruction tags from the script to form a set of interrelated tokens and instantiates an object corresponding AU to each token. The interpreter interprets the set of tokens by executing the object instance corresponding to each token. A telephonic speech engine receives a voice command for Web content received from a user via a telephone interfacing to the integrated server. A remote client is interconnected to the integrated server via a network. The voice transceiver sends a remote method invocation identifying the Web content to the remote client. The remote client includes an applet associated with a browser running on the remote client and requesting the Web content from the server responsive to the remote method invocation. The browser receives the Web content.

A further embodiment of the present invention is a fielded voice control system for retrieving Web content onto a browser using a voice transceiver. A corporate server comprises an enterprise resource planning system and a server suite which cooperatively provide enterprise information formatted as substantially dynamic Web content. A local server is interconnected to the corporate server via a low bandwidth network and comprises a server suite providing Web content. A portable client is interconnected to the local server via a high bandwidth network having an effective data rate higher than the effective data rate of the low bandwidth network. The portable client comprises a voice transceiver and a speech engine. The voice transceiver includes a parser parsing the instruction tags from the script to form a set of interrelated tokens and instantiating an object corresponding to each token and an interpreter interpreting the set of tokens by executing the object instance corresponding to each token. A speech engine receives a voice command on the voice transceiver from a user for Web content. The voice transceiver requests the Web content from the local server responsive to the voice command and the voice transceiver presents the Web content to the user upon the receipt thereof from the server.

A further embodiment of the present invention is a fielded voice control system for retrieving Web content onto a browser using a telephone. A corporate server comprises an enterprise resource planning system, a server suite, a voice transceiver, and a telephonic speech engine. The enterprise resource planning system and the server suite cooperatively provide enterprise information formatted as substantially dynamic Web content. The voice transceiver includes a parser which parses the instruction tags from the script to form a set of interrelated tokens and instantiates an object corresponding to each token and an interpreter which interprets the set of tokens by executing the object instance corresponding to each token. The telephonic speech engine receives a voice command for Web content received from a user via a telephone interfacing to the corporate server. A local server is interconnected to the corporate server via a low bandwidth network and comprises a server suite providing Web content. A remote client is interconnected to the local server via a network. The voice transceiver sends a remote method invocation identifying the Web content requested by the voice command to the remote client. The remote client includes an applet associated with a browser running on the remote client and requesting the Web content from the local server responsive to the remote method invocation. The browser receives the Web content.

A further embodiment of the present invention is a system and process for preemptive voice-controlled information retrieval using a voice transceiver. A voice transceiver executes a conversation template which comprises a script of tagged instructions comprising voice prompts. An interrupt handler monitors receipt of further conversation templates to the voice transceiver during the execution of the conversation template. A session stack temporarily stores an activation record for the conversation template being executed by the voice transceiver upon the receipt of a further conversation template by the interrupt handler and subsequent execution of the further conversation template by the voice transceiver. A speech engine processes a voice command identifying information content to be retrieved. The voice transceiver sends a remote method invocation requesting the identified information content to an applet process associated with a Web browser. An applet method retrieves the identified information content on the Web browser responsive to the remote method invocation.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

I. System for Voice-controlled Information Retrieval

A. Prior Art

Figure 1:
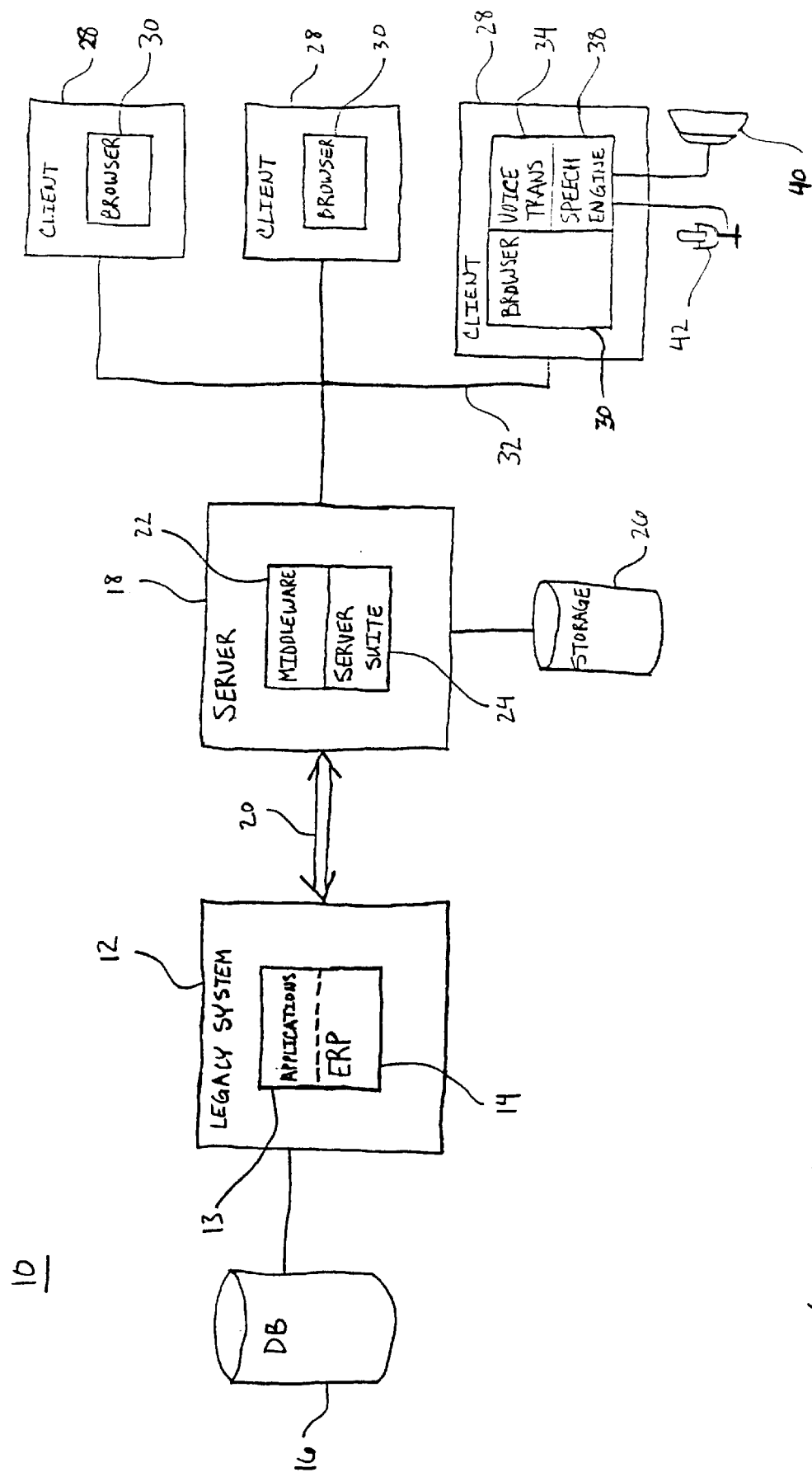
FIG. 1 is a block diagram of a prior art system for retrieving information using a voice-enabled browser.

FIG. 1 is a block diagram of a prior art system 10 for retrieving information using a voice-enabled Web browser 36. The system 10 includes four main components: legacy system 12, server 18, clients 28, and voice transceiver 34. Except as otherwise noted, the legacy system 12, the server 18, the clients 28 and the voice transceiver 34 are general purpose computing devices which include a central processing unit connected to a memory and include input and output devices (not shown). Typically, the legacy system 12 is a main frame computer or minicomputer upon which an organization runs business applications 13 referred to as "legacy applications." The applications 13 generally perform core functions central to the operations of a business and include payroll, human resources, marketing, sales, engineering, and similar applications. Most legacy applications 13 interface to a database 16 upon which information is stored. The legacy system 12 also runs an enterprise resource planning (ERP) system 14 which is a business management application which integrates or replaces the separate business applications 13 into a single integrated program. The ERP system 14 enables access to the legacy information stored in the database 16.

The legacy system 12 is interfaced to a server 18 via an interface 20 operating under a proprietary protocol, such as IBM's systems network architecture (SNA), or open protocol, such as TCP/IP. The server 18 is a conventional network server, such as a minicomputer or personal computer, configured to operate under the control of a server suite 24. For instance, the server suite 24 could provide the functionality of a Web server for providing content over the Internet or intranet (not shown). ("Web" is a shorthand for Worldwide Web and is commonly used to refer to scripted documents exchanged over the Internet or an intranet using the HyperText Transport Protocol (HTTP).

The server 18 also includes middleware 22 for converting legacy information received from the business applications 13 or the ERP system 14 into a format usable by the server suite 24. Generally, the middleware 22 formats the legacy information into Web content which can be served to individual clients 28 for viewing on a Web browser 30. The server 18 includes a secondary storage device 26 for storing programs and information. The secondary storage device 26 can include any form of conventional random or non-random access storage device, such as a hard drive or CD-ROM drive with fixed or removable media, as is known in the art. Each client 28 can also be coupled to a secondary storage device (not shown).

Each client 28 is interconnected to the server 18 via a network 32, such as the Internet or an intranet. Information is exchanged over the network 32 via an upper layer protocol, such as HTTP, operable over the Internet protocol (IP) as is known in the art.

Finally, the voice transceiver 34 is also interconnected with the server 18 via the network 32. The voice transceiver 34 is a wearable, thin client computing device, such as described in the related, commonly-assigned U.S. patent application Ser. No. 09/045,260, filed Mar. 20, 1998, pending, the disclosure of which is incorporated herein by reference. The voice transceiver 34 includes a voice-enabled Web browser 36 and a speech engine 38 for enabling a user to interface with the server 18. The speech engine 38 enables the browser 36 to navigate through and retrieve Web content responsive to voice commands received via a microphone 42. Basic navigation commands can be played on a speaker 40 by speech engine 38.

Figure 2:
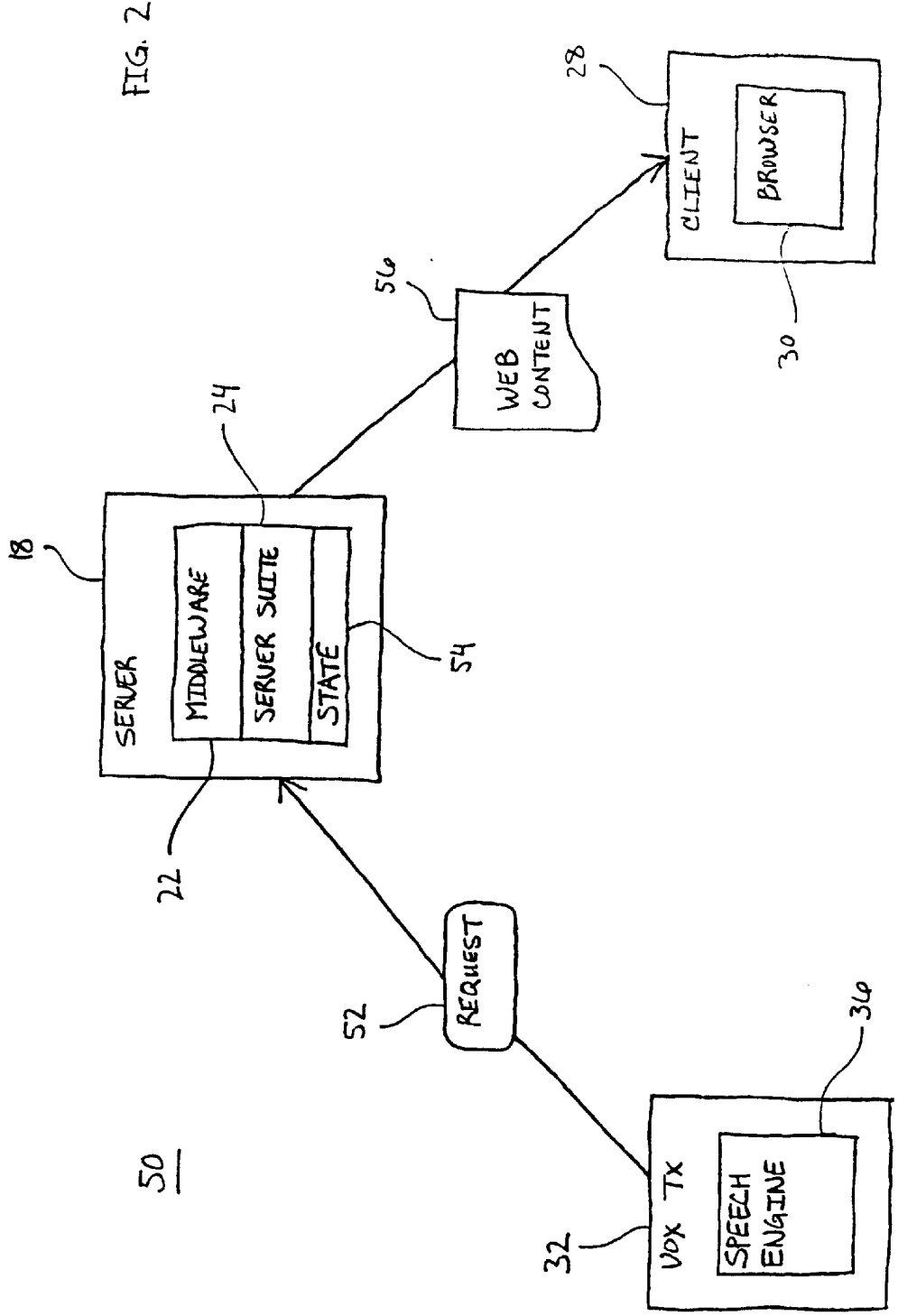
FIG. 2 is a process flow diagram showing an information retrieval request transacted using the prior art system of FIG. 1.

FIG. 2 is a process flow diagram showing an information retrieval request 50 transacted using the prior art system 10 of FIG. 1. Each client 28 operates autonomously from each other client 28 and the voice transceiver 34. Neither a particular client 28 nor the voice transceiver 34 has control over the content displayed on each other.

For the voice transceiver 32 to request Web content for display on a browser 30 running on a given client 28, the voice transceiver 32 must first send a request 52 to the server 18. The server 18 stores state 54 describing the characteristics of each interconnected client 28 and includes additional functionality with which to interpret the request 52 and to send Web content 56 to the browser 30 responsive to the request 52.

This prior art approach requires the server suite 24 to be modified to handle requests 52 and to maintain the clients' state 54 on the server 18. In particular, maintaining state 54 on the server 18 can adversely affect the performance, code complexity, and portability of the server 18.

B. System for Voice-controlled Information Retrieval

Figure 3:
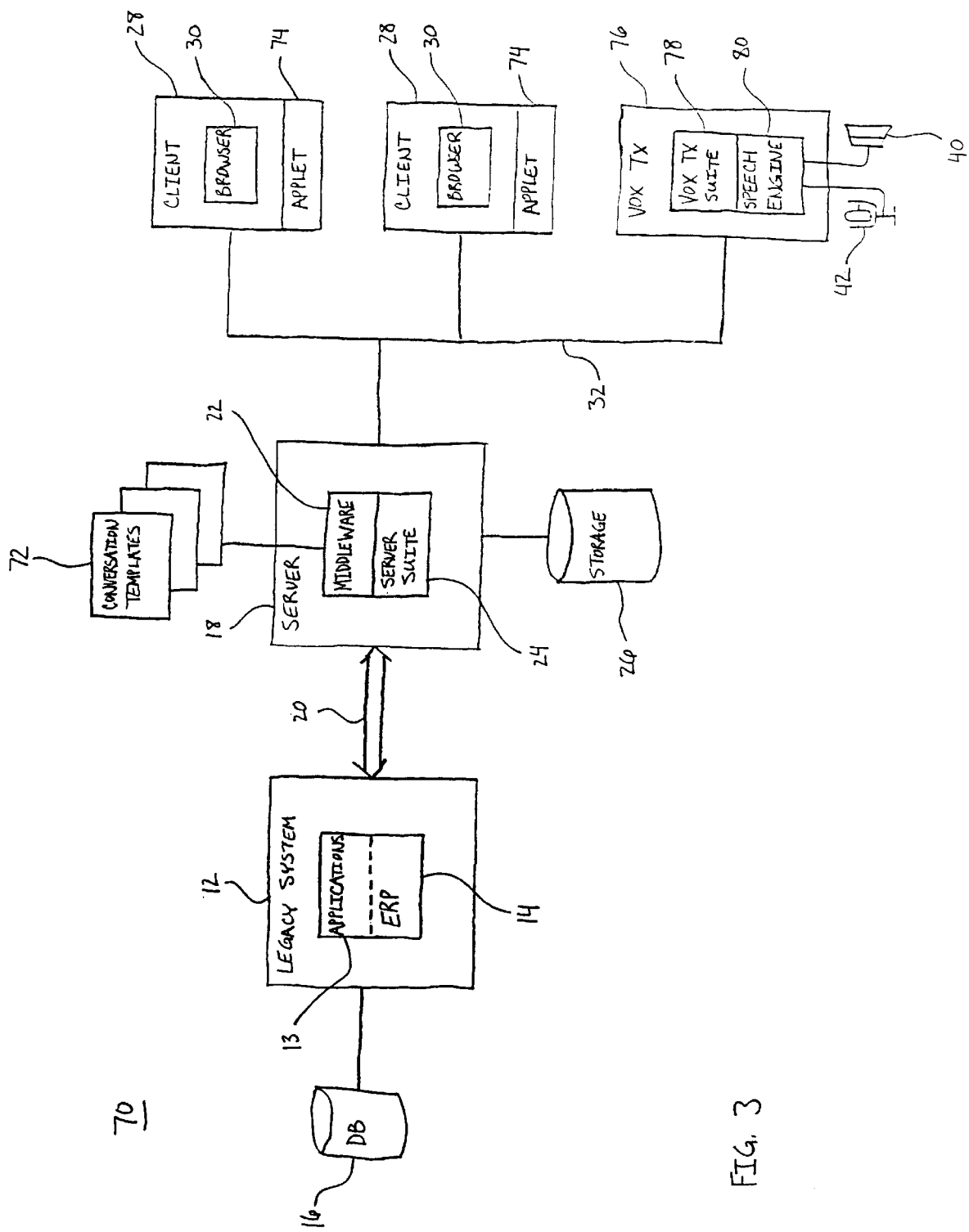
FIG. 3 is a block diagram of a system for voice-controlled information retrieval in accordance with the present invention.

FIG. 3 is a block diagram of a system 70 for voice-controlled information retrieval in accordance with the present invention. Except as otherwise noted, the components of the system 70 perform similar functions as those components described with reference to FIG. 1.

The server suite 24 provides standard network server functionality but serves two additional forms of content particular to the system 70. First, the server suite 24 serves standard Web content and similar information to be processed or displayed on the clients 28. In addition, the server suite 24 serves conversation templates 72 to voice transceiver 76. Each conversation template 72 consists of a script of tagged instructions expressed in a speech markup language, as further described below. Also, the server suite 24 downloads additional markup for enabling remote method invocations to each of the clients 28, as further described below with reference to FIG. 4.

The voice transceiver 76 includes a voice transceiver suite 78 and speech engine 80 which together execute the conversation templates 72 and process voice commands received via the microphone 42, as further described below with reference to FIG. 8. The voice transceiver 76 can be equipped with an optional display (not shown). The voice transceiver suite 78 performs three principal functions: executing conversation templates 72 which consist of scripts of tagged instructions in a voice markup language; interpreting voice commands and voice prompts according to the conversation template 72; and communicating with a browser 30 operating on a possibly separate client 28 in response to specialized markup found in the conversation template 72.

The speech engine 80 plays voice prompts to the user via the speaker 40 and receives voice commands from the user via the microphone 42, both of which are processed by the speech engine 80. The voice prompts and voice commands are communicated between the voice transceiver suite 78 and the speech engine 80 through an application programming interface (API), as further described below with reference to FIG. 5A.

The combination of the conversation templates 72, the voice transceiver 76, and the applets 74 provide a user and developer friendly, speech only system 70 with the capability to display or make available Web content on a browser 30 running on a client 28 which is operating independent of the voice transceiver 76. The voice transceiver 76 operates as a speech only device with the capability of displaying or presenting content on browsers 30 operating on separate clients 28.

The voice transceiver suite 78 interprets the conversation template 72 in a manner similar to the manner in which a Web browser interprets a visual markup language, such as HyperText Mark-up Language (HTML). The voice transceiver suite 78, however, interprets scripts written in a speech markup language rather than a visual markup language. Speech markup languages define a linear sequence of steps which are dynamic in nature and require the user to interact with the voice transceiver 76 before any action can be taken. Like visual markup languages, the context in which a speech markup language script is being executed is known, but a dynamic characteristic is provided as a user response is required, not merely optional.

In the described embodiment, the conversation templates 72 are written in a modified version of the VoxML voice markup language, a markup language developed specifically for voice applications useable over the Web. The VoxML language is described in "Motorola's VoxML™ Voice Markup Language," VoxML White Paper, Draft 3, Motorola Inc., available at http://www.VoxML.com/VoxML.html, the disclosure of which is incorporated herein by reference. Other speech markup languages can also be used, such as the SpeechML language, licensed by IBM; the PML language, licensed by Lucent Technologies; and the VXML language, an emerging voice markup language standard presently being specified by a consortium of companies, including AT&T, Motorola, and Lucent Technologies, the specification of which can be found at http//www.vxmlforum.org.

This speech markup language includes additional markup elements used to control the actions of one or more remote Web browsers. Using this speech markup language, a developer can describe a completely speech-driven user interface which incorporates both speech and pictures without having to develop custom and complex server-based code to control the synchronization of pictures with speech.

The speech markup language used in the described embodiment is defined in the document type definition (DTD) attached as a speech markup document in Appendix A. The user definable DTD allows the necessary functionality required by the present invention to be built into the speech markup language to support extended remote browser control commands, such as WWWSHOW and WWWACTIVATE, as further described below with reference to FIGS. 11 and 12, respectively.

Unlike visual markup languages, speech markup languages express a dynamic sequence of steps which can be performed multiple times within a given context. For example, the following code segment causes the phrase "Good morning" to be played by the voice transceiver 76 over the speaker 40:

```
<DIALOG>
    <STEP Name="foo"/>
        <PROMPT>Good morning</PROMPT>
    </STEP>
</DIALOG>
```

EXAMPLE 1

The following code segment causes the phrase "there are 6 widgets in bin area 3" to be played by the voice transceiver 76 over the speaker 40:

```
<DIALOG>
    <STEP Name="foo"/>
        <PROMPT>There are <%=widgetnum>
            widgets in bin <%=widgetbin>
        </PROMPT>
    </STEP>
    <INPUT TYPE="optionlist" NAME="optionChosen">
        <OPTION NEXT="#end"> Exit System </Option>
    </INPUT>
</DIALOG>
```

EXAMPLE 2 where the fields %=widgetnum and %=widgetbin are parameter fields which the middleware 22 populates with appropriate speech phrase values, such as, for instance, "6" and "area 3," respectively.

Here, the speech markup language defined in the DTD of Appendix A provides a combination of speech and visual markup language features for a speech-driven user interface. Consequently, a browser 30 running on a remote client 28 can be remotely controlled by voice commands issued through the voice transceiver 76. In contrast to conventional non-speech markup language models, the speech markup language used in the described embodiment allows a user to perform a sequence of steps through speech commands and to specify information to be retrieved to a browser 30 in the context of an ongoing "conversation" with the server 18. Importantly, the speech markup language does not specify the Web content to be displayed on the browser 30. Rather, the user specifies the Web content to be retrieved, if any, through voice commands. Thus, the focus is on speech operations, not markup language program steps.

Figure 4:
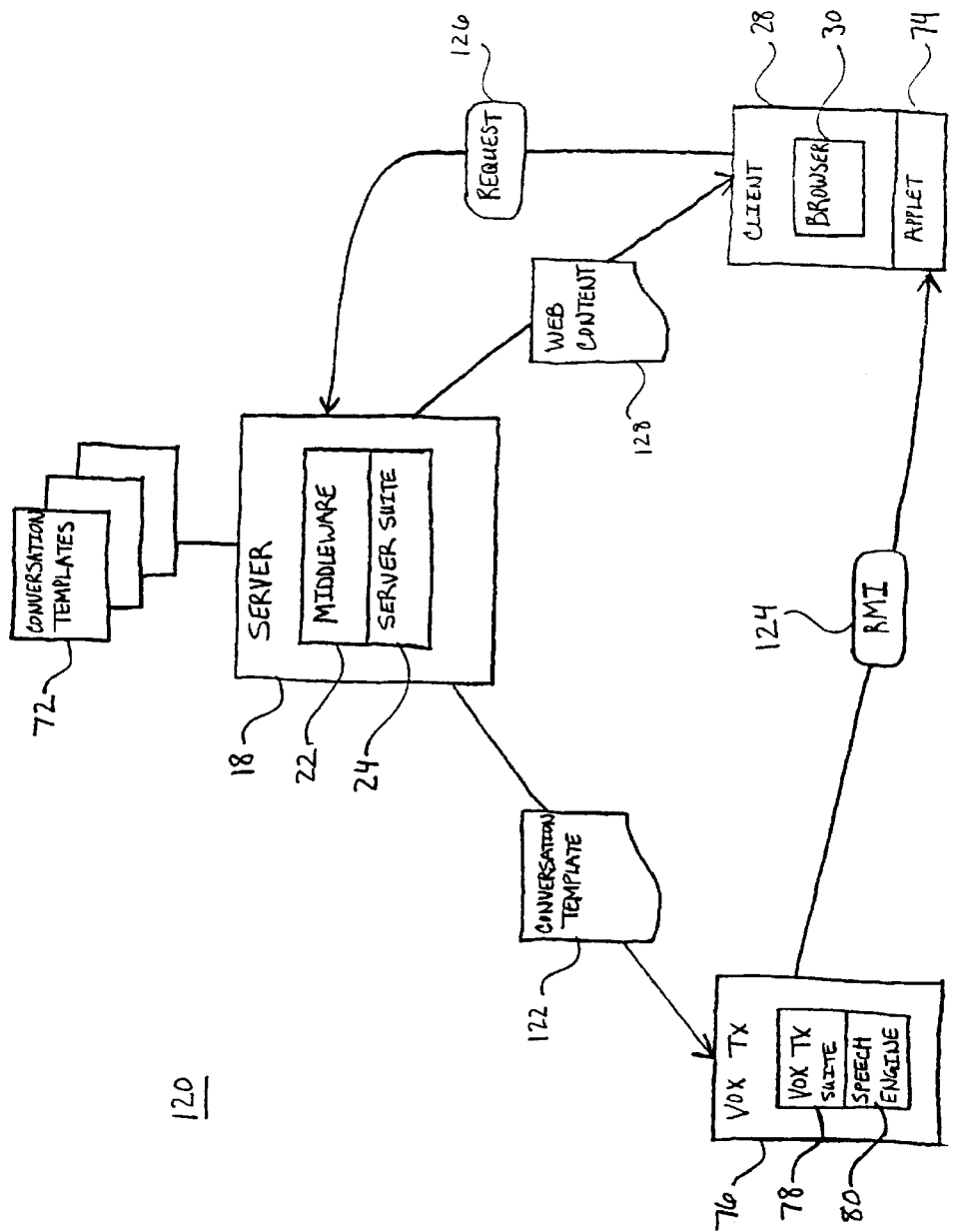
FIG. 4 is a process flow diagram showing an information retrieval request transacted using the system of FIG. 3.

FIG. 4 is a process flow diagram showing an information retrieval request 120 transacted using the system 70 of FIG. 3. Each client 28 operates autonomously from each other client 28 and the voice transceiver 76. The voice transceiver 76 is not normally equipped with a display and is therefore limited to presenting only speech content to the user via the speaker 40 (shown in FIG. 3). Other forms of content, such as graphical images, video clips or form fields ordinarily cannot be displayed or presented by the voice transceiver 76. Additionally, a user might find displaying or presenting content on a browser running on another client 28 convenient or useful, such as where data is to be shared between several users. Also, the browser could be run on the voice transceiver 76.

The applet 74 associated with each client 28 allows the voice transceiver 76 to "control" the information viewed on a browser 30 running on a given client 28, as further described below with reference to FIG. 8. Briefly, a conversation template 122 is received by the voice transceiver 76. If the conversation template 122 contains references to visual content and consequently requires either the display or activation of content on a browser 30, the voice transceiver 76 sends a remote method invocation (RMI) message 124 to an applet 74 associated with a browser 30 running on a remote client 28.

An applet 74 is a program designed to be executed from within a browser 30. The described embodiment uses applets written in the JAVA programming language, licensed by Sun Microsystems, Palo Alto, Calif. The browser 30 must be a JAVA-enabled Web browser such as the Hot JAVA browser, licensed by Sun Microsystems; the Internet Explorer browser, licensed by Microsoft Corporation, Redmond, Wash.; or the Netscape Navigator browser, licensed by Netscape Communications Corporation, Mountain View, Calif.

The voice transceiver 76 executes a method downloaded in an applet from the server 18 upon receipt of the RMI message 124 from the voice transceiver 76. The RMI message can be any type of remote procedure call, including a DCOM reference, such that the remote procedure call causes the client 28 to operate under the direct control of the voice transceiver 76. Thus, in response to the receipt of the RMI message 124, the applet 74 causes the browser 30 to send a normal HTTP request 126 to the server 18. In response to the request 126, the server 18 serves Web content 128 to the client 28 for display or presentation on the browser 30.

Two forms of applets 74, WWWSHOW and WWWACTIVATE, are used in the described embodiment for showing and activating Web content on a remote client 28, as further described below with reference to FIGS. 11 and 12, respectively. Other forms of applets 74 are possible. The purpose of each applet 74 is to provide control over a remote browser 30 by enabling the voice transceiver 76 to perform remotely any operation which could be performed locally on the browser 30 by a user.

Appendix B is a pseudo-code listing of a class BrowseCtl which extends the Applet class. The purpose of the BrowseCtl class is to allow a user to control a browser 30 on a remote client 28 by creating a new browser frame in which is displayed Web content specified by the voice transceiver 76 via the applet 74. A new browser frame is created and an instance of the class BrowseCtl is created and registered with the remote method invocation (RMI) service on the server suite 24. Each method call to the instance of class BrowseCtl causes the remembered frame to be obtained and an appropriate action be taken.

In addition, the WWWACTIVATE command can be augmented to add speech control to embedded applets. For instance, a CGM file viewer implemented as an applet can be voice-controlled by adding VoxML language commands into the conversation templates 72 for performing CGM steps such as Zoom In and Zoom Out. An applet method corresponding to each of the desired voice commands would also need to be present in the CGM applet definition.

Figure 5A:
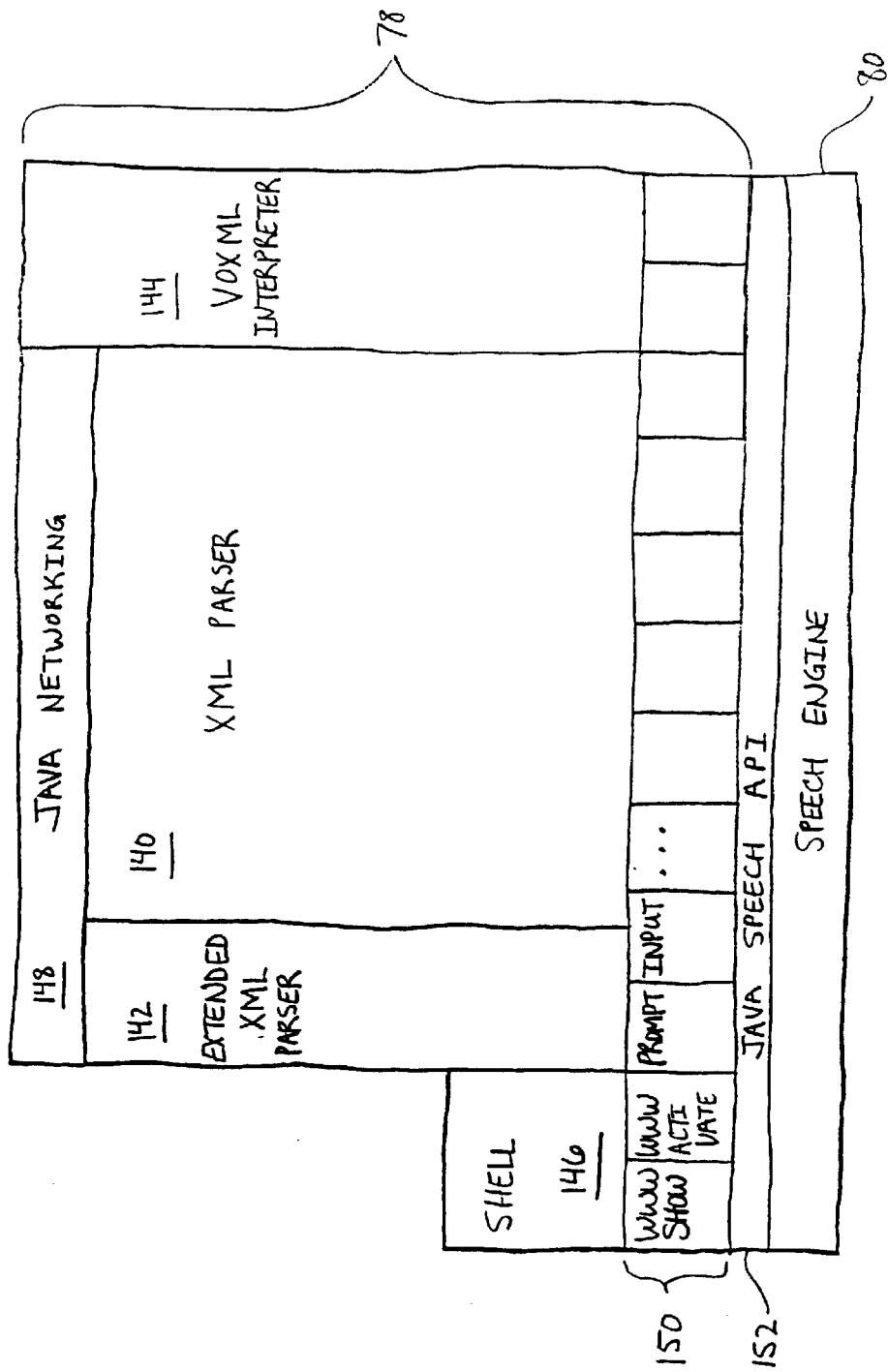
FIG. 5A is a block diagram of a voice transceiver for use in the system of FIG. 4.

FIG. 5A is a block diagram of the voice transceiver 76 for use in the system 70 of FIG. 3. The voice transceiver 76 includes two main components, voice transceiver suite 78 and speech engine 80, which are conceptually separated by a JAVA speech API 152. The speech engine 80 is an off-the-shelf component, which in the described embodiment is the IBM Via Voice product, licensed by IBM. Alternatively, the speech engines licensed by Lernout and Hauspie or Dragon Systems could be used. The main requirement for the voice transceiver suite 78 is that it support the standard JAVA programming language speech API 152.

The voice transceiver suite 78 utilizes an object-oriented programming model. The voice transceiver suite 78 principally consists of XML parser 140, extended XML parser 142, shell 146, and VoxML interpreter 144, each of which are written in the JAVA programming language. The interpreter 144 uses a parse tree built by the XML parser 140 and the extended XML parser 142 to execute commands parsed from the script of the conversation template 122. As further described below with reference to FIG. 8, the voice transceiver suite 78 executes the conversation template 122 (shown in FIG. 4) to form an interactive session with a user.

In the described embodiment, the XML parser 140 is based on the XML Parser For JAVA, licensed by IBM. Both the XML parser 140 and the extended XML parser 142 parse through the conversation template 122, as is known in the art, and builds a parse tree 180 using tokens parsed from the conversation template 122. Each token corresponds to a tag defined in the DTD (Attachment A). In addition, the XML parser 140 and the extended XML parser 142 create instances 150 of objects corresponding to each token parsed from the conversation template 122. The object instances 150 are used by the interpreter 144 at runtime.

The interpreter 144 executes the individual commands as specified by STEP tags from each element in the script of the conversation template 122. To optimize performance, the interpreter 144 uses the object instantiations 150 during run time. The parse tree 180 built by the XML parser 140 and extended XML parser 142 is used by the interpreter 144 for searching. However, the programmatical flow of execution is defined by the ordering of STEP tags. In accordance with the VoxML language specification, each STEP tag defines an atomic operation which can include a logical grouping of several nested tags.

The shell 146 includes several built-in speech commands for use with the voice transceiver 76. These are commands which can be used for basic navigation in conjunction with a visual Web browser 30 (shown in FIG. 3). For example, the built-in commands include "next page," "previous page," and "reload current page." In addition, the built-in commands in the shell 146 can trigger an appropriate browser action. There are also built-in commands for turning the microphone 42 on and off.

The voice transceiver suite 78 interfaces to the network 32 (shown in FIG. 3) via the JAVA networking module 148. The JAVA networking module 148 is provided by and documented in the JAVA Development Kit, Version 1.1, licensed by Sun Microsystems Inc., Palo Alto, Calif. The JAVA speech API 152 is also provided by and documented as a separate product licensed by Sun Microsystems Inc.

Figure 5B:
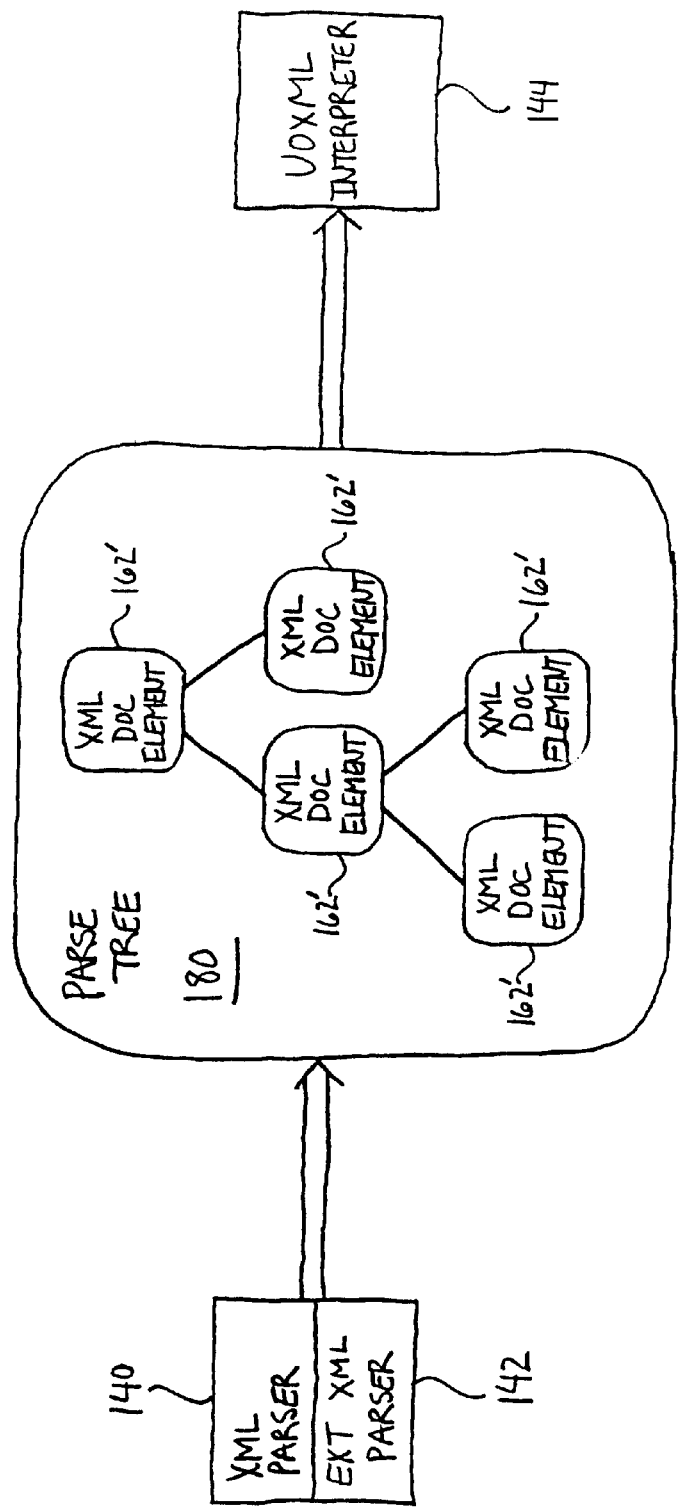
FIG. 5B is a process flow diagram showing the main modules and data structures used by the voice transceiver of FIG. 5A.

FIG. 5B is a process flow diagram 155 showing the main modules and data structures used by the voice transceiver suite 78 of FIG. 5A. The XML parser 140 and extended XML parser 142 generate a parse tree 180, as further described below with reference to FIG. 7, and create object instances 162' of the class XML Document Element 162, as further described below with reference to FIG. 6. Each object instance 162' corresponds to a token parsed from the conversation template 122. The parse tree 180 and object instances 162' are used by the VoxML interpreter 144 to execute the conversation template 122.

II. Class Descriptions and Data Structures

A. Class Description

Figure 6:
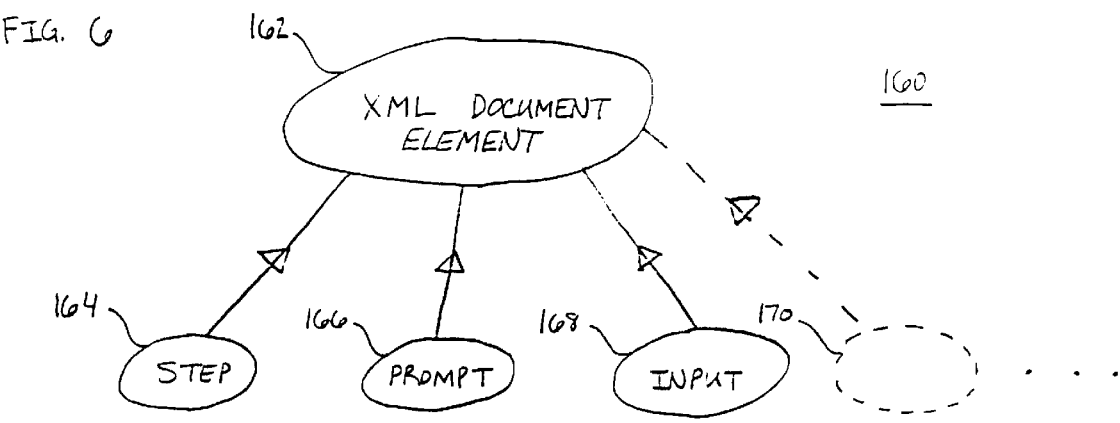
FIG. 6 shows, by way of example, a class diagram of an object definition in accordance with the present invention.

FIG. 6 shows, by way of example, a class diagram 160 of an object definition in accordance with the present invention. The voice transceiver suite 78 employs an object-based model. Each token representing an element in the DTD (Attachment A) is instantiated as an object of the class XML Document Element 162. Each of the objects step 164, prompt 166, input 168, and any others 170, descend from the class XML Document Element 162.

B. Data Structures

Figure 7:
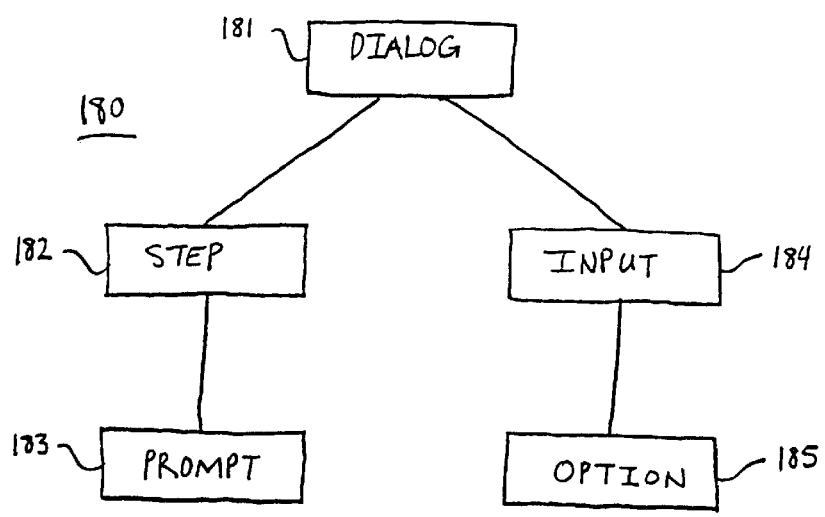
FIG. 7 shows, by way of example, a parse tree generated by the voice transceiver of FIG. 5.

FIG. 7 shows, by way of example, a parse tree 180 generated by the XML parser 140 and the extended XML parser 142 of the voice transceiver 76 of FIG. 5. The parse tree 180 corresponds to the code segment described above in Example 2. Each node of the parse tree 180 corresponds to the tag from each element in the script of the conversation template 122. The parse tree 10 is hierarchically structured with a root node descending downward to children nodes. Children nodes which themselves have children nodes descending downward are non-terminal nodes and children nodes with no children nodes are terminal nodes.

The root of the parse tree 180 is the node dialog 181. The non-terminal children nodes step 182 and input 184 both descend from the root node dialog 181. Similarly, the child node prompt 183 descends from the node step 182 and the child node option 185 descends from the child node input 184. As further described below with reference to FIG. 10, the parse tree 180 is traversed in a modified depth first search fashion. However, other data structures, in addition to hierarchical tree structures, could be used to effect a similar result.

The links interconnecting the steps 181–185 of the parse tree 180 are created and maintained by pointers (not shown) within each of the object instances 150 (shown in FIG. 5) as private data members. Accessor methods which are inherited as part of the XML document element 162 are used to traverse the parse tree 180.

III. Process for Voice-Controlled Information Retrieval

A. Overview

Figure 8:
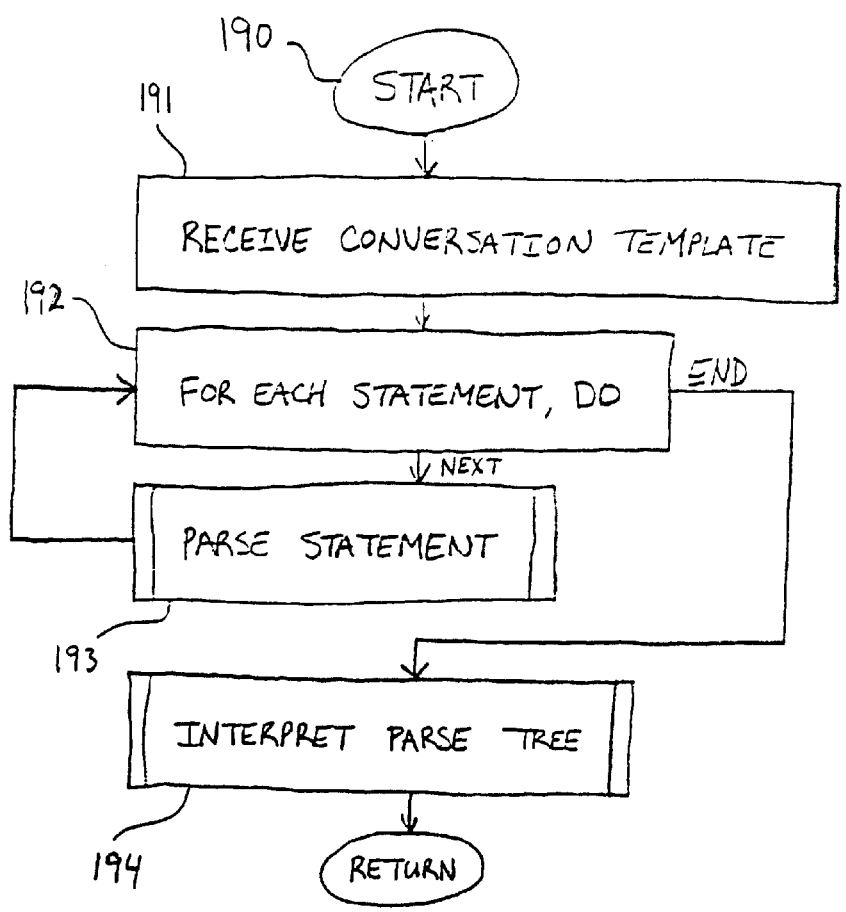
FIG. 8 is a flow diagram of a process for voice-controlled information retrieval in accordance with the present invention.

FIG. 8 is a flow diagram of a process 190 for voice-controlled information retrieval in accordance with the present invention. The process 190 operates under a voice-driven paradigm. The conversation template 122 provides a list of tasks to be performed. Appendix C is an XML language source code listing of an exemplary conversation template 122.

Responsive to a user request, the conversation template 191 is received (block 191). For each statement in the conversation template 122 (block 192), the statement is parsed (block 193), as further described below with reference to FIG. 9. After all of the statements in the conversation template 122 have been parsed (block 192), the parse tree 180 (shown, by way of example, in FIG. 7) is interpreted (block 194), as further described below with reference to FIG. 10.

B. Parser

Figure 9:
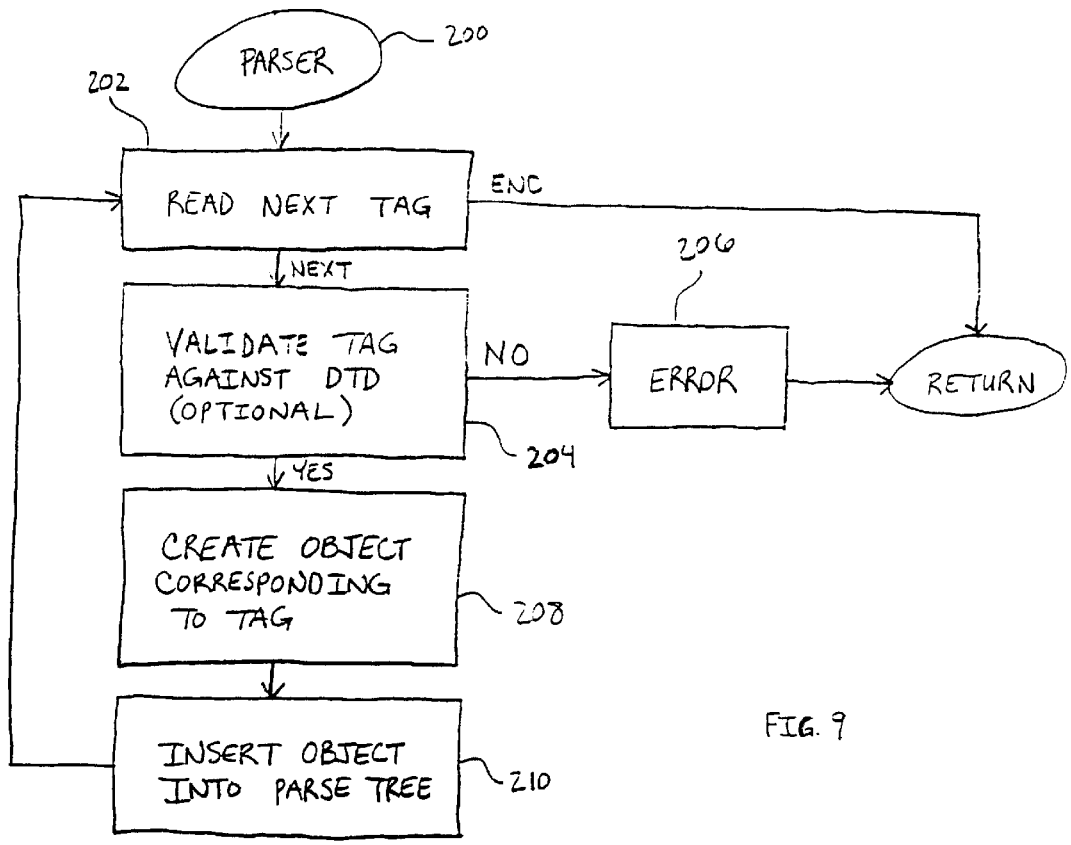
FIG. 9 is a flow diagram of a parser routine for use in the process of FIG. 8.

FIG. 9 is a flow diagram of the parser routine 200 for use in the process 190 of FIG. 8. The purpose of this routine is to process the tags in the conversation template 122 in accordance with the DTD (Appendix A). The parser routine 200 receives as input one XML element of the conversation template 122 at a time. Thus, each tag occurring within the document is read (block 202) until the entire document has been parsed. Optionally, each tag can be validated against the DTD (Appendix A) (block 204). If the tag is not validated (block 204), an error condition exists (block 206) and the routine returns. Otherwise, an object 150 (shown in FIG. 5) is created corresponding to the tag (block 208). Finally, the object is inserted into the parse tree (for example, shown in FIG. 7) (block 210). Processing ends after each tag has been read (block 202).

C. Interpreter

Figure 10:
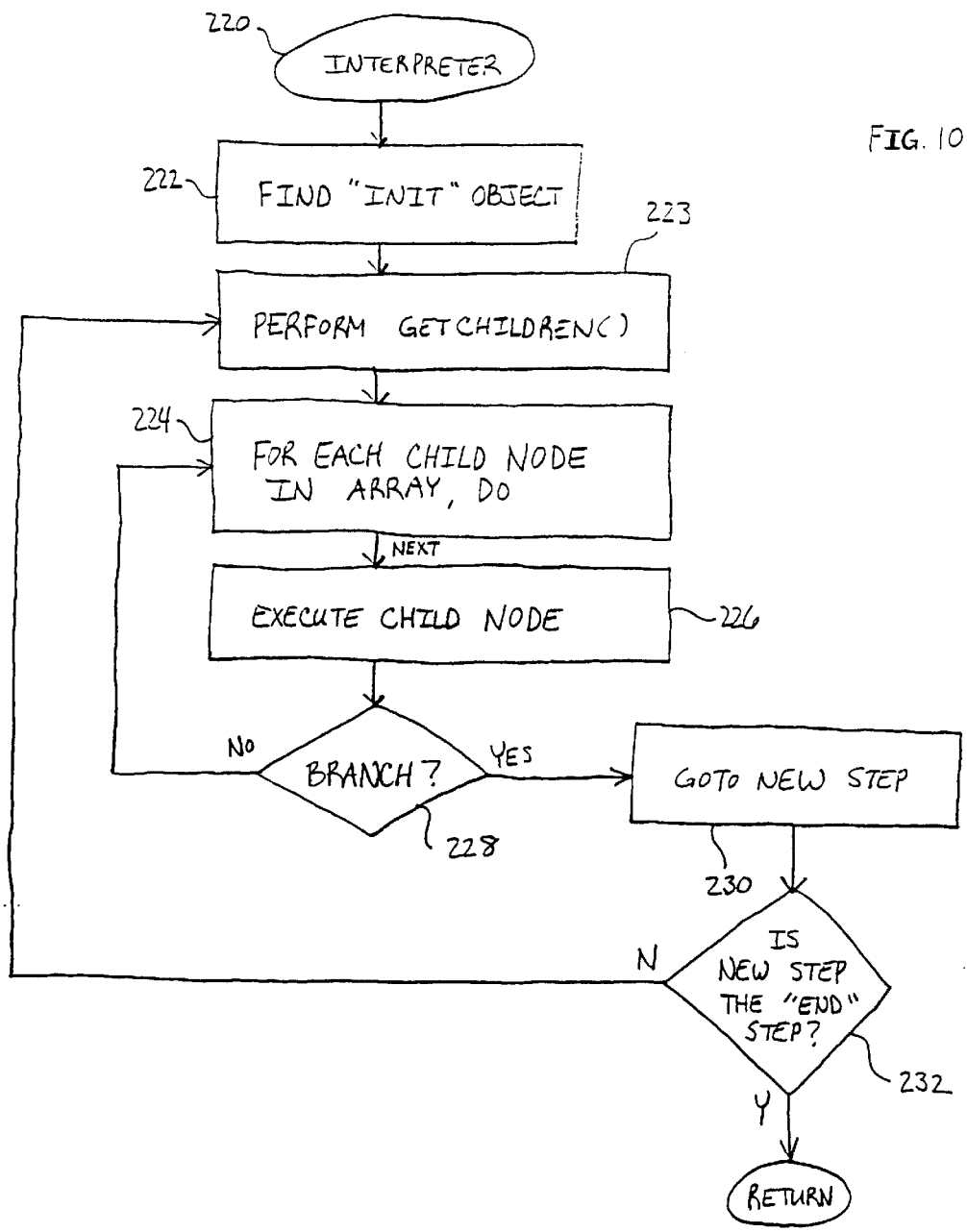
FIG. 10 is a flow diagram of an interpreter routine for use in the process of FIG. 8.

FIG. 10 is a flow diagram of an interpreter routine 220 for use in the process 190 of FIG. 8. The purpose of this routine is to carry out a "conversation" by executing the conversation template 122 through a traversal of the parse tree 180 built by the parser routine 200 (shown in FIG. 9). The XML element object that represents the VoxML step named "init" is found (block 222). Next, the accessor method getchildren ( ) is performed (block 223). The accessor method getchildren ( ) is defined by the XML document element 162 class definition and returns an array of pointers to children nodes. Next, for each child node in the array (block 224), the child node is executed (block 226) using the object instantiation 150 (shown in FIG. 5). A list of recognized executable voice commands and prompts can be found in the VoxML 1.0 Language Reference, Revision 1.0, Motorola, Inc., Consumer Applications and Services Division, September 1998, available at http://www.VoxML.com/VoxML.html, the disclosure of which is incorporated herein by reference. In addition, the present invention introduces WWWSHOW and WWWACTIVATE elements, as further described below with reference to FIGS. 11 and 12, respectively. If the child step branches to another step (block 228), control flows to the new step (block 230). If the new step is the END step (block 232), the "conversation" ends. Otherwise, if the new step is not the END step (block 232), the accessor method getchildren ( ) is performed (block 223) and the children nodes are processed as before (blocks 224–230). Otherwise, if no branch step is present (block 228), the next child step in the array is processed (block 224) until all children in the step have been processed.

D. Applets

Figure 11:
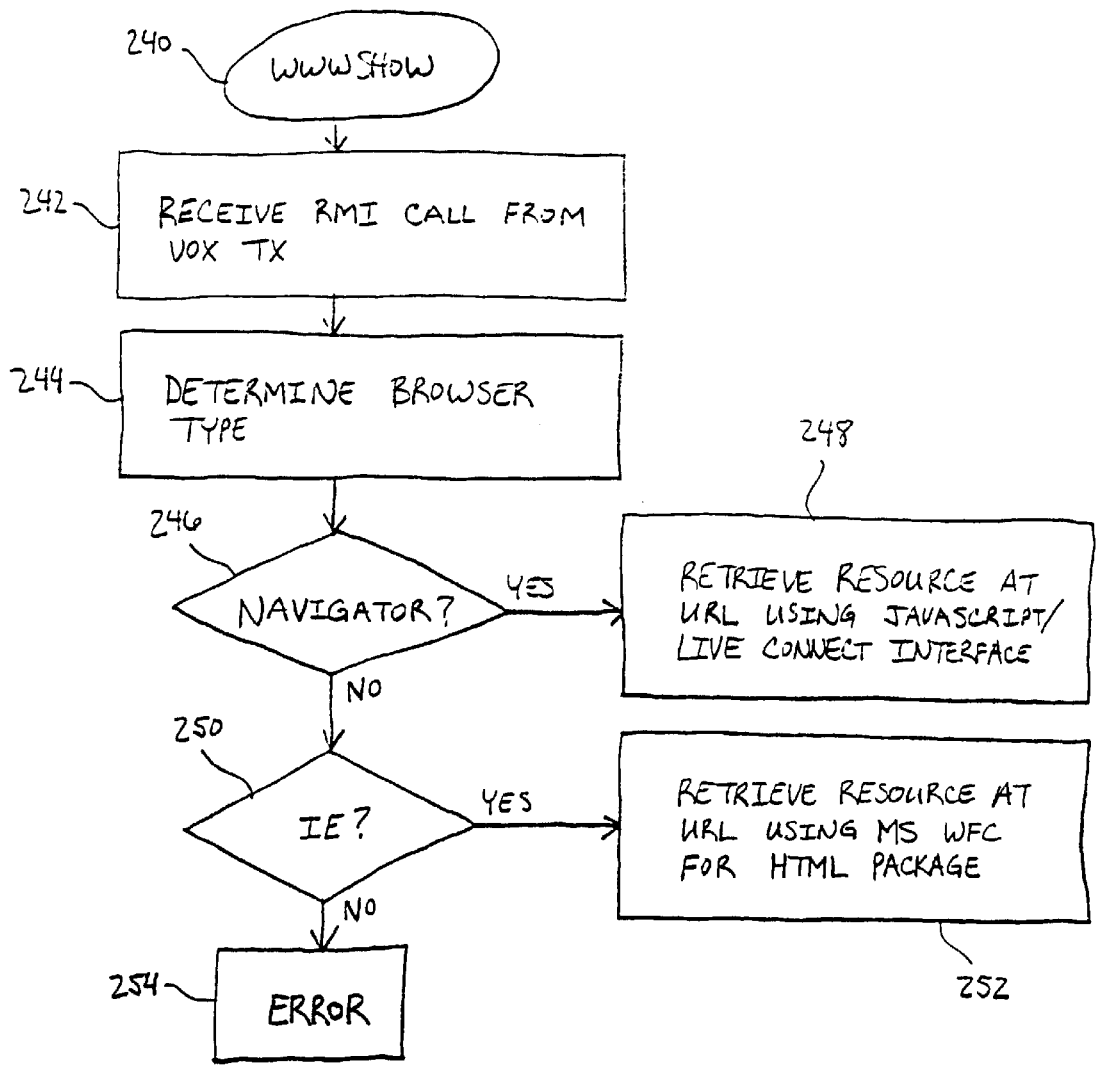
FIG. 11 is a flow diagram of a process for retrieving information content responsive to voice control in accordance with the present invention.
Figure 12:
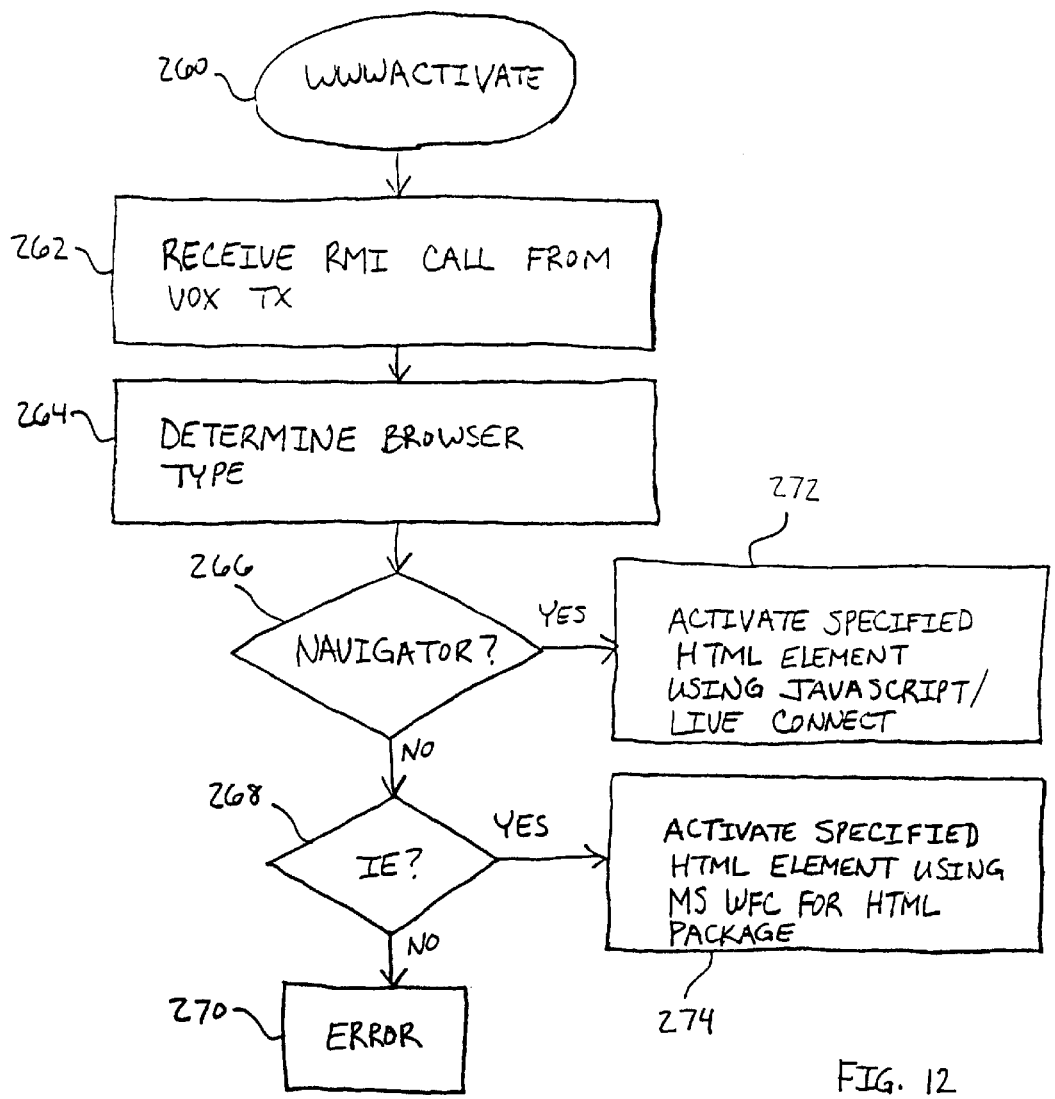
FIG. 12 is a flow diagram of a process for activating content responsive to voice control in accordance with the present invention.

FIG. 11 is a flow diagram of a process 240 for retrieving information content responsive to voice control in accordance with the present invention. In the described embodiment, the process 240 corresponds to the WWWSHOW element for the extended VoxML Markup language. This process operates as part of the applet 74 (shown in FIG. 4) associated with a browser 30 running on a client 28. Its purpose is to instruct the Web browser 30 to retrieve a resource in response to an RMI message 124 received from the voice transceiver 76. The Web browser 30 then retrieves the information referenced by a uniform resource locator (URL) passed as a parameter in the RMI message 124. The URL can include either a relative or absolute path name. When relative URLs are used, these URLs are relative to the VoxML document that contains them.

First, the RMI message 124 call is received from the voice transceiver 76 (block 242). The type of browser 30 is determined (block 244). If the browser 30 is a Netscape Navigator-type browser (block 246), the resource identified by the URL is retrieved using the Javascript/Live Connect interface (block 248). Otherwise, if an Internet Explorer-type browser is used (block 250), the resource identified by the URL is retrieved using Microsoft's Windows Foundation Classes (WFC) for HTML package (block 252). If neither a Netscape Navigator-type or Internet Explorer-type browser is used (blocks 246 and 250), an error condition exists (block 254).

FIG. 11 is a flow diagram of a process 260 for activating Web page content responsive to voice control in accordance with the preset invention. Its purpose is to enable a user to activate or manipulate visual content on a Web browser from a voice transceiver 76. This process corresponds to the WWWACTIVATE element for the extended VoxML language. This process operates as part of the applet 74 (shown in FIG. 4) associated with a browser 30 running on a client 28. For instance, the WWWACTIVATE element could be used to log into a service by using the voice transceiver 76 to fill in information in the various fields of a Web page displayed on the browser 30. The WWWACTIVATE process 260 includes three parameters: Type, Name, and Element.

First, the RMI message 124 call is received from the voice transceiver 76 (block 262). The type of browser 30 is determined (block 264). If the browser 30 is a Netscape Navigator-type browser (block 266), the resource identified by the URL is retrieved using the Javascript/Live Connect interface (block 268). Otherwise, if an Internet Explorer-type browser is used (block 260), the resource identified by the URL is retrieved using Microsoft's WFC for HTML package (block 262). If neither a Netscape Navigator-type or Internet Explorer-type browser is used (blocks 266 and 260), an error condition exists (block 264).

E. Preemptive Voice-controlled Information Retrieval

Figure 13A:
FIGS. 13A–13C are block diagrams showing a session stack for use in a process for preemptive voice-controlled information retrieval in accordance with a further embodiment of the present invention.
Figure 13B:
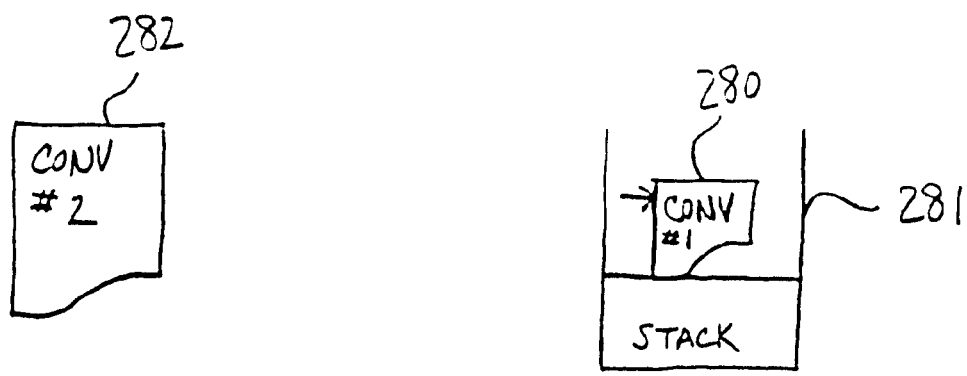
Figure 13C:
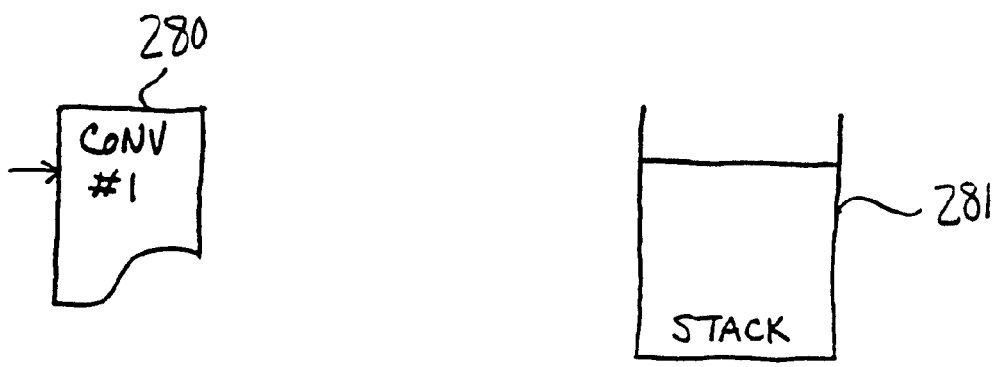

FIGS. 13A–13C are block diagrams showing a session stack 281 for use in a process for preemptive voice-controlled information retrieval in accordance with a further embodiment of the present invention. Ordinarily, process execution flows along a single execution thread from the start to the completion of a given speech task as defined by a conversation template 72. However, the execution of a conversation thread can be preemptively interrupted through the use of a session stack 281. Referring to FIG. 13A, a first conversation thread 280 is executed by the voice transceiver 76 (shown in FIG. 3). A push-down Last-In, First-Out (LIFO) session stack 281 is empty. A second conversation thread 282 is received by the voice transceiver 76. The voice transceiver 76 includes an interrupt handler consisting of a network listener (not shown) which monitors the network port connecting the voice transceiver 76 to the network 32. If a URL specifying the starting place of a new VoxML session is received, the network listener generates an interrupt to the voice transceiver 76. Referring to FIG. 13B, the second conversation thread 282 is executed while the first conversation thread 280 is pushed onto the session stack 281. The voice transceiver 76 completes the interrupting conversation before resuming execution of the original conversation. Referring to FIG. 13C, when the execution of the second conversation thread 282 has completed, execution of the first conversation thread 280 has resumed and the session stack 281 is now empty.

Figure 14:
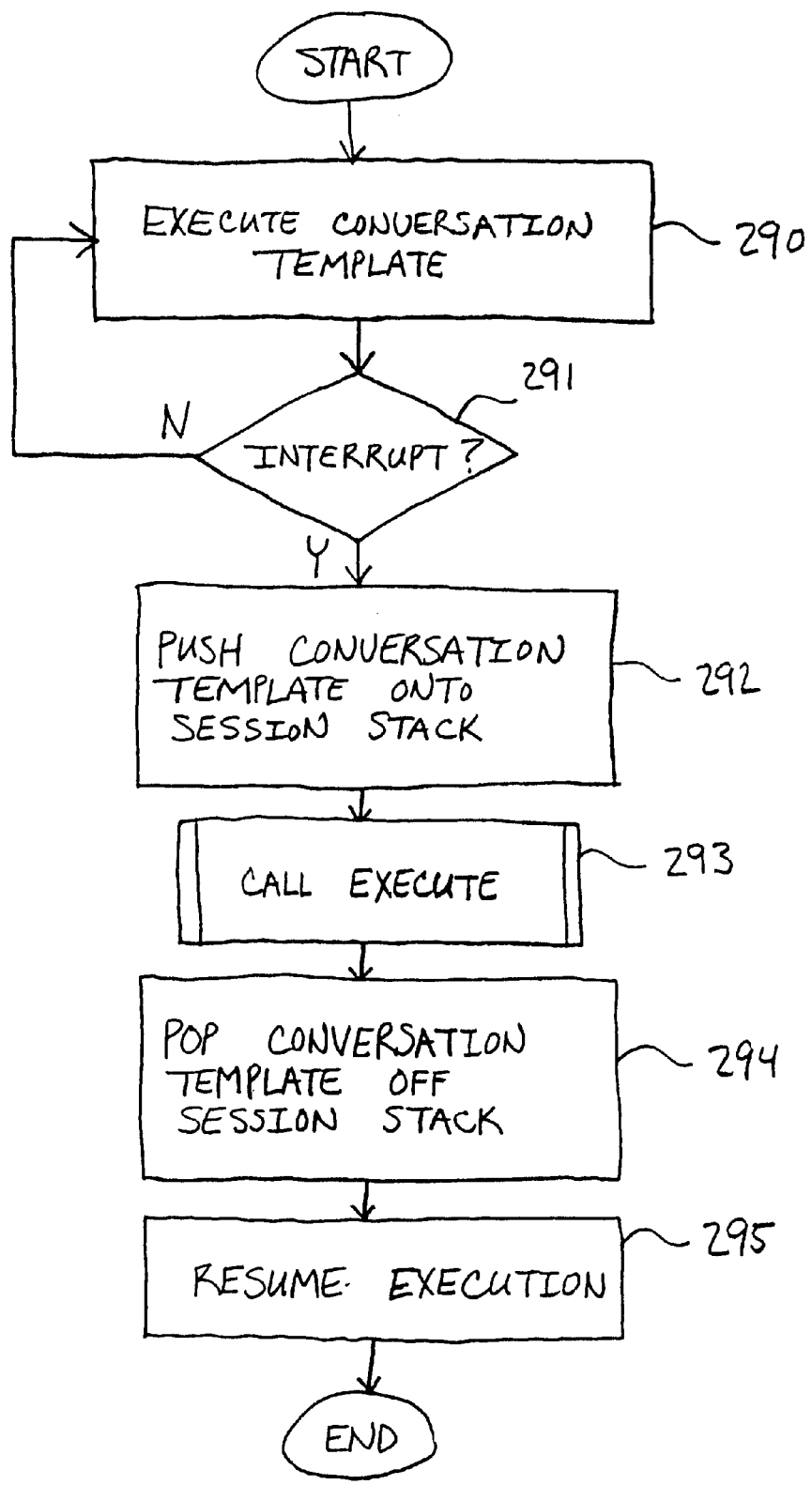
FIG. 14 is a flow diagram of a process for preemptive voice-controlled information retrieval using the session stack of FIGS. 13A–13C.

FIG. 14 is a flow diagram of a process for preemptive voice-controlled information retrieval using the session stack 281 of FIGS. 13A–13C. A conversation template 72 is executed (block 290). if there is no interruption generated by the network listener (block 291), execution of the conversation template continues as before (block 290). If execution is interrupted (block 291), the activation record for the execution of the conversation template 72 is pushed onto the session stack (block 292). The voice transceiver 76 operates in an interrupt-driven fashion with the interrupting process being completed before execution of the previously interrupted process resumes. Thus, the process of FIG. 14 is iteratively called (block 293) for the execution of the interrupting conversation template. Upon the completion of the execution of the interrupting conversation template (block 293), the activation record for the execution of the interrupted conversation template is popped off the session stack (block 294) and execution resumes as before (block 295).

Note that the order of execution does not affect the order of the execution of the steps in each parse tree 180. However, the order in which the VoxML interpreter 144 processes the individual parse trees 180 themselves changes based on interrupts.

IV. Alternate Embodiments

A. Integrated ERP Server System

Figure 15:
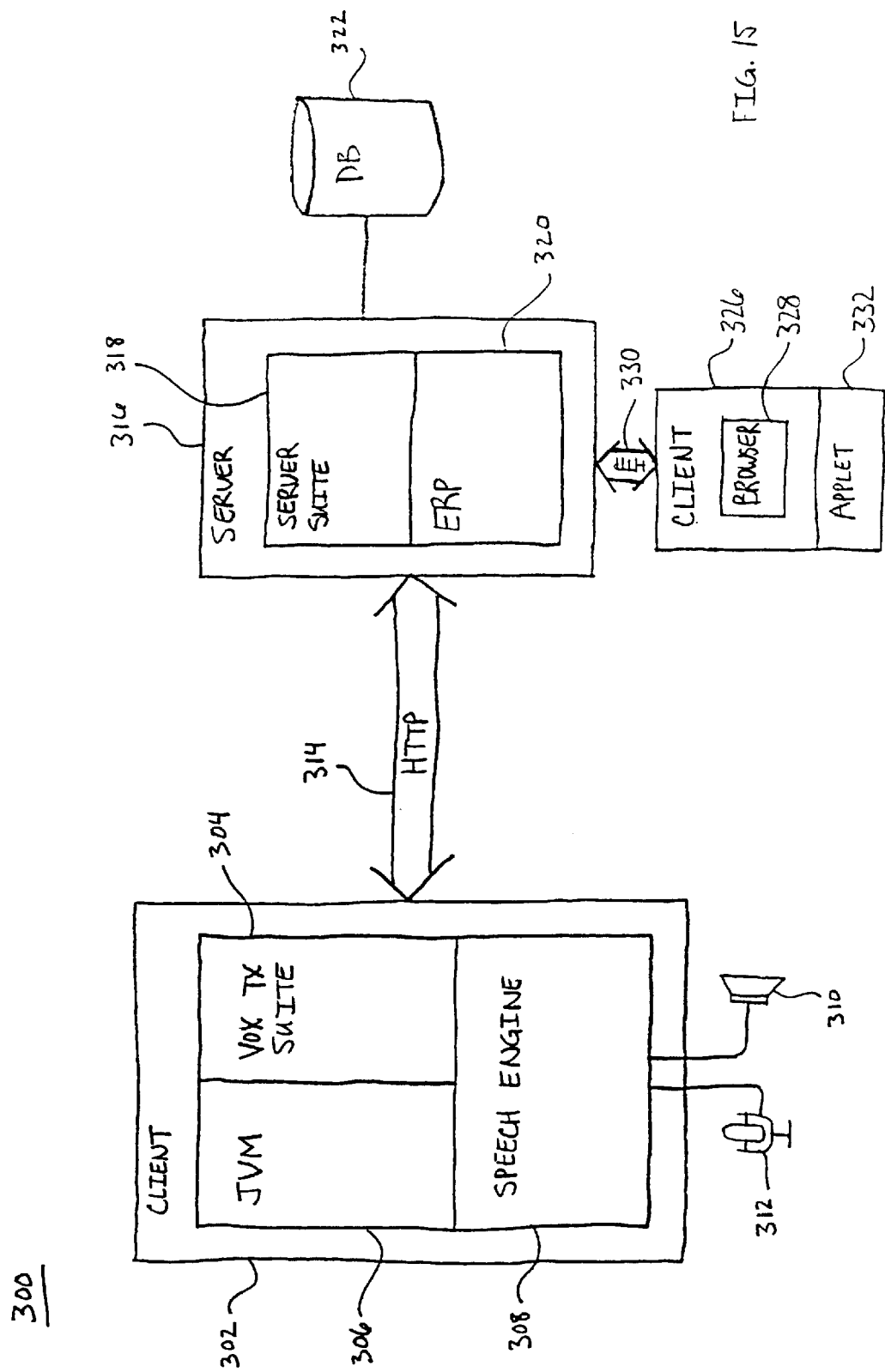
FIG. 15 is a functional block diagram of a further embodiment of the present invention comprising an integrated enterprise resource planning server.

FIG. 15 is a functional block diagram of a further embodiment of an integrated ERP server system 300 in accordance with the present invention. In this embodiment, the server 316 integrates the server suite 318 and ERP system 320 with access to the database 322. ERP information is directly served as Web content via a network 314, such as the Internet or an intranet, using HTTP to a voice transceiver client 302. In addition, the voice transceiver client 302 includes a JAVA Virtual Machine (JVM) 306, a voice transceiver suite 304, and a speech engine 308. The voice transceiver client 302 need not include a separate JAVA-enabled browser application so long as a JVM 306 is available with which to execute the voice transceiver suite 304.

A user interface, including a microphone 312 and speaker device 310, enables a user to interface to the server 316 using voice commands. In addition, the system 300 can include a remote client 326 upon which is run a browser 328. The remote client 326 is interconnected to the server 316 via a network 330 which could be the same as or a separate network from the network 314 and also uses HTTP. Finally, the remote client 326 includes an applet 332 with which to respond to RMI calls from the voice transceiver client 302.

B. Telephonic Control System

Figure 16:
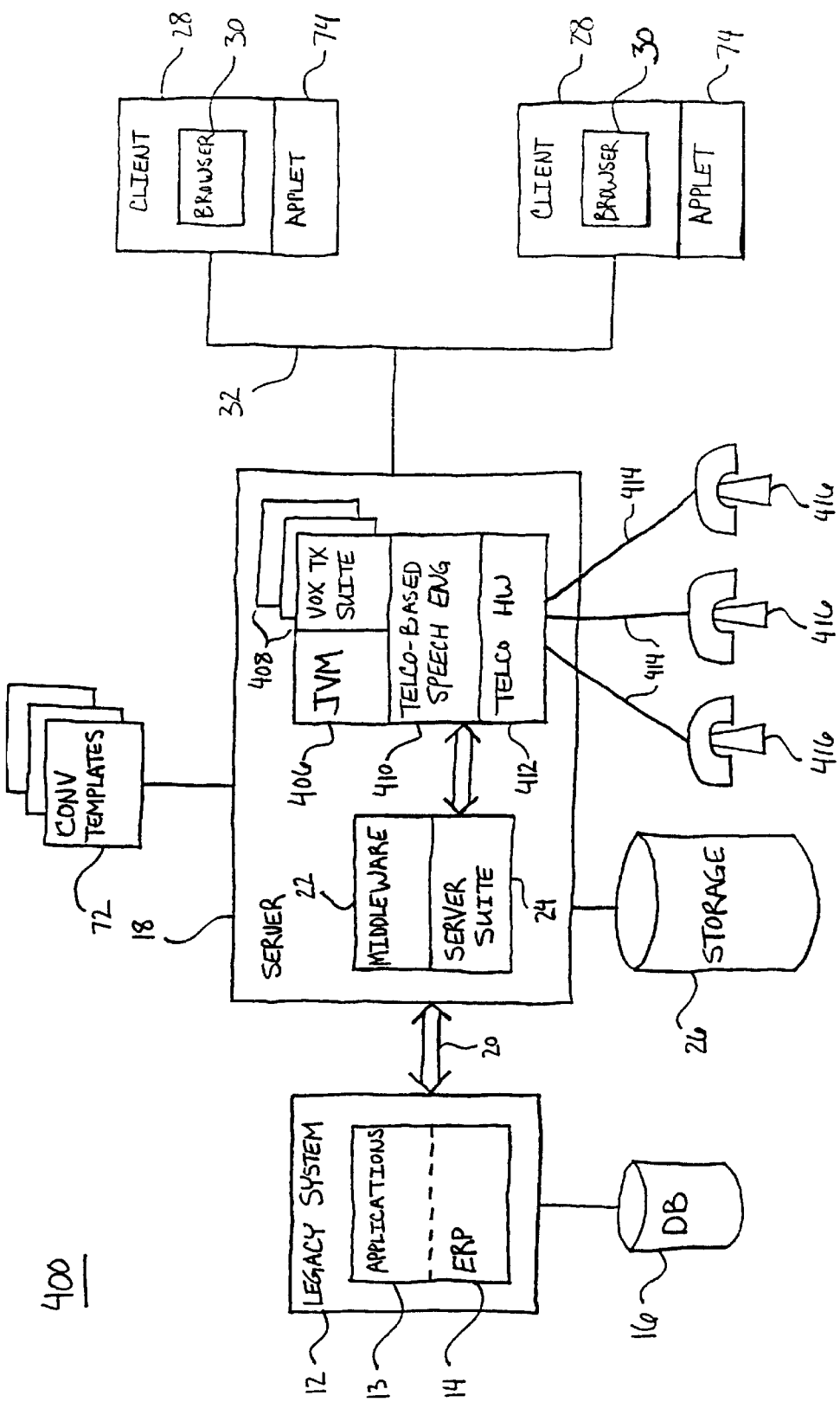
FIG. 16 is a functional block diagram of a further embodiment of the present invention comprising a telephonic control system.

FIG. 16 is a functional block diagram of a further embodiment of a telephonic control system 400 in accordance with the present invention. The purpose of this system is to provide information retrieval using a speech only interface, such as with a telephone 416 interfaced to the server 18. All voice transceiver and server functionality is provided by the server 18. Multiple voice transceiver suites 408 are executed by a Java virtual machine (JVM) 406. Each of the voice transceiver suites 408 are interfaced to a telephone company (TELCO) based speech engine 410 which in turn interfaces to telephone company hardware 412. Each of the telephones 416 are interconnected to the telephone company hardware 412 via some means for interconnection 414 which could be conventional telephone lines, cellular telephone lines, satellite telephone lines, or similar types of devices. There is one voice transceiver suite 408 per telephone device 416 in the described embodiment. The voice transceiver suites 408 interface to the middleware 22 and server suite 24 to serve ERP information from the database 16 in the form of Web content. A telephone company based speech engine 410 suitable for use in the system 400 is the speech engine licensed by Nuance, Communications, Menlo Park, Calif. Telephone company hardware 412 suitable for use in the system 400 is manufactured by Dialogic Corporation, Parsippangy, N.J.

The system 400 of FIG. 14 is suitable for providing a speech only user interface in an environment requiring infrequent use of pictures. This system is particularly suited for use with, by way of example, a cellular telephone simultaneously augmented with ad hoc graphics which are loosely coupled to a user conversation with the computer. In addition, specially outfitted, standard Web browsers 30 running on clients 28 connected to the server 18 via the network 32 could be distributed throughout a work area to deburden locally mobile workers from having to carry portable displays. Using the system 400, users can request information to be presented at the nearest fixed client 28 having a display.

C. Fielded Voice Control System

Figure 17:
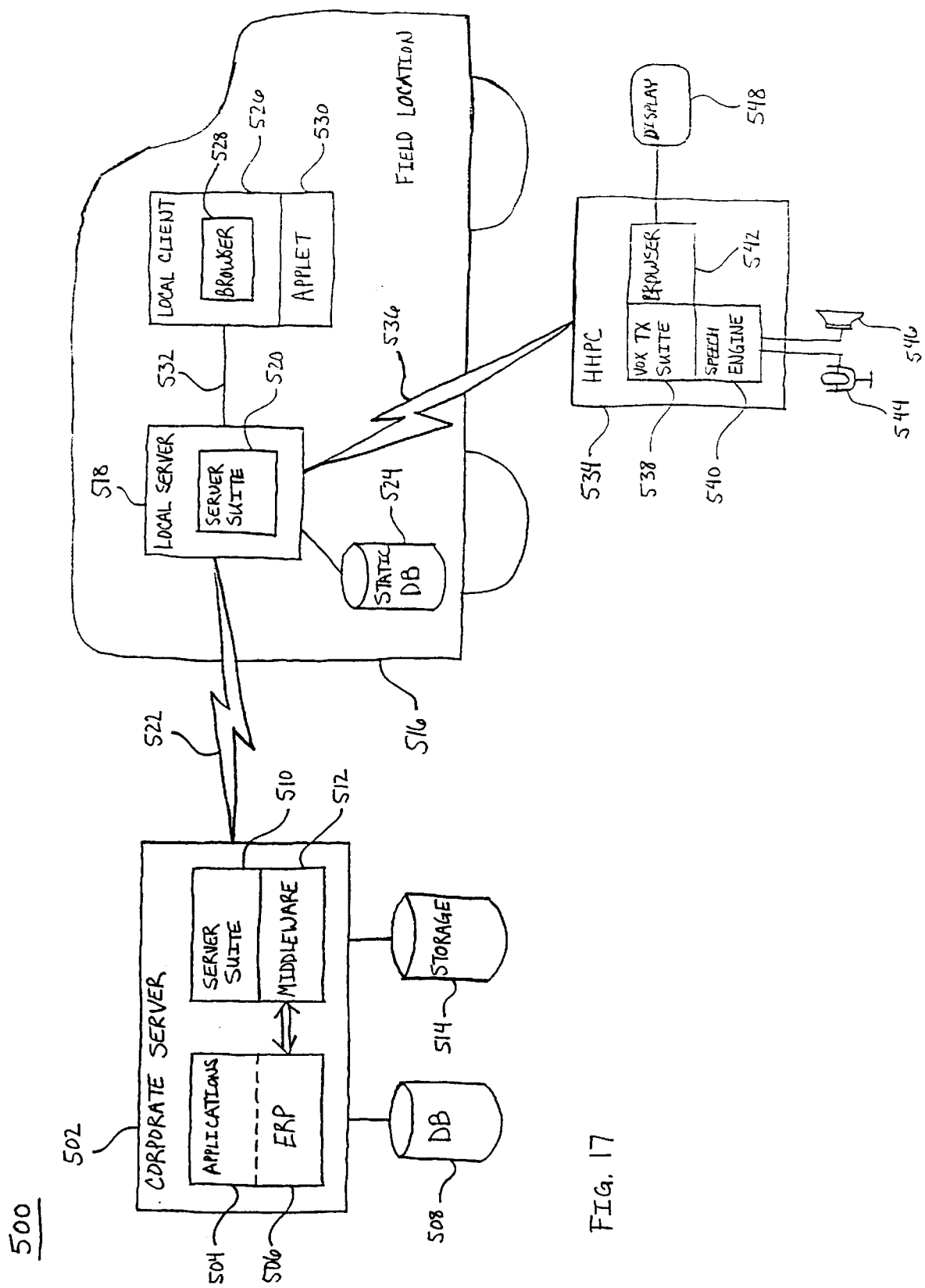
FIG. 17 is a functional block diagram of a further embodiment of the present invention comprising a fielded voice control system.

FIG. 17 is a functional block diagram of a further embodiment of the present invention comprising a fielded voice control system 500 in accordance with the present invention. The purpose of this system is to provide high-speed access to relatively static information using a fielded local server 518 interconnected to a corporate server via a lower bandwidth connection. A conventional corporate server 502 integrates the applications 504 and ERP system 506 with a server suite 510 and middleware 512. The ERP system 506 accesses a database 508 containing ERP information which is converted into servable Web content using the middleware 512. The server suite 510 serves the Web content formatted ERP information as described above. The corporate server 502 includes a storage device 514 upon which can be stored conversation templates and other non-volatile information (not shown).

The corporate server 502 is coupled to a local server 518 which is situated in a field location 516. In the described embodiment, the field location 516 could be a portable location, such as a utility truck, or fixed remote location. The local server 518 includes a server suite 520. The local server 518 is interconnected to the corporate sever 502 via a low bandwidth connection 522. In the described embodiment, the low bandwidth connection 522 has a data rate of about 2400 bits per second to 40 kilobytes per second, such as provided by CDPD or GSM. The local server 518 is interconnected to a local client 526 via a high bandwidth connection 532. In the described embodiment, the high bandwidth connection 532 provides a data rate of 50 kilobytes per second to 100 megabits per second, such as provided by 10 BaseT or 100 BaseT Ethernet or a 2.4 GHz spread spectrum wireless LAN.

The local client 526 includes a browser 528 and an applet 530 which is downloaded from the server suite 520 on the local server 518. The local server 518 includes a static database 524 with which to serve static, relatively unchanging information, such as images or videos, to the browser 528 on the local client 526.

The local server 518 is also interconnected to a hand-held personal computer (HHPC) 534 which provides voice control over the system 500. The HHPC 534 includes a voice transceiver suite 538, a speech engine 540, and a browser 542. The HHPC 534 includes a microphone 544, speaker 546, and display 548 and is interconnected to the local server 518 via a high bandwidth connection 536 which could be conventional or wireless, such as 2.4 GHz wireless LAN products such as sold by Proxim and Lucent Technologies. These products typically adhere to the IEEE 802.11 wireless LAN standard. An HHPC 534 suitable for use in the system 500 of FIG. 15 is a Toshiba Libretto 110 CT hand-held personal computer.

In operation, the system 500 could be used to provide a mobile worker with information using a portable, or stationary, but locally situated, Web server which has lower bandwidth requirements for accessing a corporate server. The improved physical proximity of the local server 630 to the mobile worker improves the bandwidth requirements over directly accessing the ERP system 606 on the remote corporate server 602. For instance, a local server 630 could be situated in a service vehicle with a slower, lower bandwidth communications link to the remote ERP system 606. The mobile worker could then access the local server 630 with a faster, higher bandwidth communications link using a Windows CE or thin client computing device. This configuration would allow static Web content to be placed in the static database 642 on the local server 630 rather than burdening the client computing device.

D. Fielded Telephonic Control System

Figure 18:
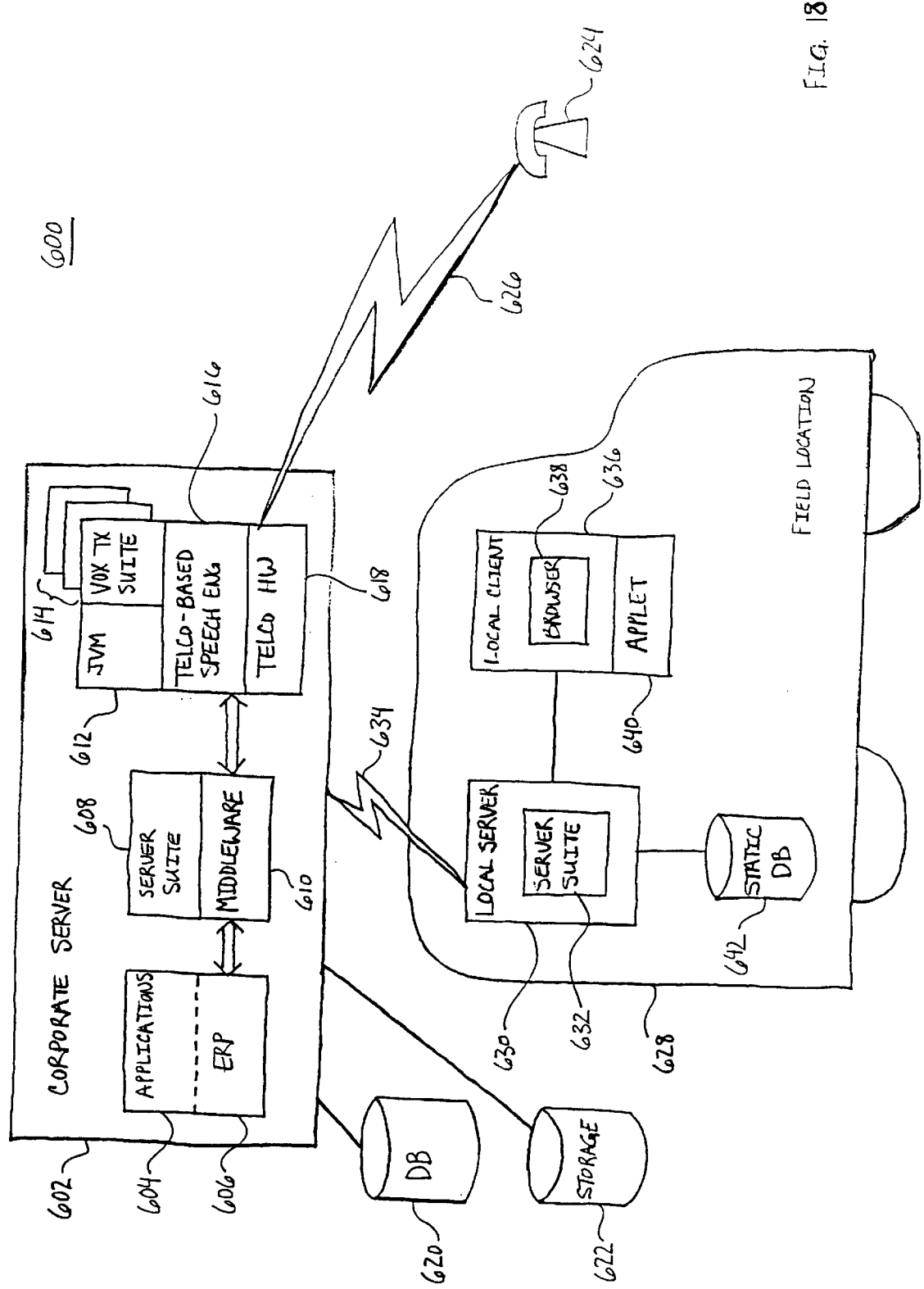
FIG. 18 is a functional block diagram of a further embodiment of the present invention comprising a fielded telephonic control system.

FIG. 18 is a functional block diagram of a further embodiment of the present invention comprising a fielded telephonic control system 600 in accordance with the present invention. The purpose of the system 600 is to provide information retrieval to a remote browser through a local server using a speech-only interface, such as with a telephone 624 interfaced to a corporate server 602. The corporate server 602 integrates all of the functionality of the legacy system 12, server 18, and voice transceiver 76 (all shown in FIG. 3) into a single server system. The applications 604 and ERP system 606 provide ERP information from a database 620 coupled to the corporate server 602. A server suite 608 and middleware 610 convert the ERP information into servable Web content. A set of voice transceiver suites 614 are executed by a JVM 612 which is interfaced to a telephone company-based speech engine 616 and telephone company hardware 618, such as described above with reference to FIG. 14. The corporate server 602 includes a storage device 622 in which conversation templates and other non-volatile information can be stored (not shown).

A telephone 624 is interconnected with the corporate server 602 via the telephone company hardware 618 over some form of telephone service 626, such as conventional or wireless service, including cellular or satellite telephone communications.

A local server 630 is situated in a field location 628, which could be a portable or stationary site, such as a utility truck or field office. The local server 630 includes a server suite 632 and is interconnected with the corporate server 602 via a low bandwidth connection 634, such as described above with reference to FIG. 15. The local server 630 serves static Web content stored in a static database 642 to a local client 636. The local client 636 includes a browser 638 and an applet 640 downloaded from the server suite 632.

In operation, a user can access visual and other high bandwidth information using the telephone 624 to access the server suite 608 running on the corporate server 602. The server suite 608 can download dynamic information to the local server 630 or cause the local server 630 to server static information on the browser 638 retrieved from the static database 642.

While the preferred embodiment of the invention has been illustrated and described, it will be appreciated that various changes can be made therein without departing from the spirit and scope of the invention.

APPENDIX A

```
<!ELEMENT   DIALOG (STEP|CLASS)*>
<!ATTLIST   DIALOG BARGEIN (Y|N) "Y">
<!ELEMENT   STEP
PROMPT|INPUT|HELP|ERROR|CANCEL|ACK|SETVAR|WWWSHOW|WWWACTVATE|GO
<!ATTLIST   STEP NAME ID #REQUIRED
                PARENT IDREF #IMPLIED
                COST CDATA #IMPLIED
                BARGEIN (Y|N) "Y">
<!ELEMENT   CLASS(PROMPT|HELP|ERROR|CANCEL|ACK)*>
<!ATTLIST   CLASS NAME ID #REQUIRED
                PARENT IDREF #IMPLIED
                COST CDATA #IMPLIED
                BARGEIN (Y|N) "Y">
<!ELEMENT   PROMPT (#PCDATA|OPTIONS|VALUE|EMP|BREAK|PROS|AUDIO)*>
<!ELEMENT   EMP (#PCDATA|OPTIONS|VALUE|EMP|BREAK|PROS|AUDIO)*>
<!ATTLIST   EMP LEVEL (STRONG|MODERATE|NONE|REDUCED) "MODERATE">
<!ELEMENT   PROS (#PCDATA|OPTIONS|VALUE|EMP|BREAK|PROS|AUDIO)*>
<!ATTLIST   PROS RATE CDATA #IMPLIED
                VOL CDATA #IMPLIED
                PITCH CDATA #IMPLIED
                RANGE CDATA #IMPLIED>
<!ELEMENT   HELP (#PCDATA|OPTIONS|VALUE|EMP|BREAK|PROS|AUDIO)*.>
<!ATTLIST   HELP ORDINAL CDATA #IMPLIED
                REPROMPT(Y|N) "N"
                NEXT CDATA #IMPLIED
                NEXTMETHOD (GET|POST) "GET">
<!ELEMENT   ERROR (#PCDATA OPTIONS|VALUE|EMP|BREAK|PROS|AUDIO)*>
<!ATTLIST   ERROR TYPE NMTOKENS "ALL"
                ORDINAL CDATA #IMPLIED
                REPROMPT (Y|N) "N"
                NEXT CDATA #IMPLIED
                NEXTMETHOD (GET|POST) "GET">
<!ELEMENT   CANCEL (#PCDATA VALUE|EMP|BREAK|PROS|AUDIO)*>
<!ATTLIST   CANCEL NEXT CDATA #REQUIRED
                NEXTMETHOD (GET|POST) "GET">
<!ELEMENT   AUDIO EMPTY>
<!ATTLIST   AUDIO SRC CDATA #REQUIRED>
<!ELEMENT   ACK (#PCDATA|OPTIONS|VALUE|EMP|BREAK|PROS|AUDIO)*>
<!ATTLIST   ACK CONFIRM NMTOKEN "YORN"
                BACKGROUND (Y|N) "N"
                REPROMPT (Y|N) "N">
<!ELEMENT   INPUT (OPTION|RESPONSE|RENAME|SWITCH|CASE)*>
<!ATTLIST   INPUT TYPE
(NONE|OPTIONLIST|RECORD|GRAMMAR|PROFILE|HIDDEN|YORN|DIGITS|
                NAME ID #IMPLIED
                NEXT CDATA #IMPLIED
                NEXTMETHOD (GET|POST) "GET"
                TIMEOUT CDATA #IMPLIED
                MIN CDATA #IMPLIED
                MAX CDATA #IMPLIED
                PROFNAME NMTOKEN #IMPLIED
                SUBTYPE NMTOKEN #IMPLIED
                SRC CDATA #IMPLIED
                VALUE CDATA #IMPLIED
                MSECS CDATA #IMPLIED
```

APPENDIX A-continued

```
                STORAGE (FILE|REQUEST) #IMPLIED
                FORMAT CDATA #IMPLIED>
<!ELEMENT   SWITCH (CASE|SWITCH)*>
<!ATTLIST   SWITCH FIELD NMTOKEN #REQUIRED>
<!ELEMENT   RESPONSE (SWITCH)*>
<!ATTLIST   RESPONSE NEXT CDATA #IMPLIED
                NEXTMETHOD (GET|POST) "GET"
                FIELDS NMTOKENS #REQUIRED>
<!ELEMENT   RENAME EMPTY>
<!ATTLIST   RENAME VARNAME NMTOKEN #REQUIRED
                RECNAME NMTOKEN #REQUIRED>
<!ELEMENT   CASE EMPTY>
<!ATTLIST   CASE VALUE CDATA #REQUIRED
                NEXT CDATA #REQUIRED
                NEXTMETHOD (GET|POST) "GET">
<!ELEMENT   VALUE EMPTY>
<!ATTLIST   VALUE NAME NMTOKEN #REQUIRED>
<!ELEMENT   BREAK EMPTY>
<!ATTLIST   BREAK MSECS CDATA #IMPLIED
                SIZE (NONE|SMALL|MEDIUM|LARGE) "MEDIUM">
<!ELEMENT   OPTIONS EMPTY>
<!ELEMENT   OR EMPTY>
<!ELEMENT   OPTION (#PCDATA|VALUE|OR)*>
<!ATTLIST   OPTION VALUE CDATA #IMPLIED
                NEXT CDATA #IMPLIED
                NEXTMETHOD (GET|POST) "GET">
<!-- Added by Inroad -->
<!ELEMENT   WWWSHOW (#PCDATA|VALUE)*>
<!ATTLIST   WWWSHOW SRC CDATA #IMPLIED>
<!ELEMENT   WWWACTIVATE (#PCDATA|VALUE|DYNATTR)*>
<!ATTLIST   WWWACTIVATE TYPE (input|select) "input"
                NAME CDATA #IMPLIED
                ELEMENT CDATA #IMPLIED
                CONTENT CDATA #IMPLIED>
<!ELEMENT   GOTO (#PCDATA)>
<!ATTLIST   GOTO NEXTMETHOD (GET|POST) "GET">
<!ELEMENT   SETVAR (DYNATTR)*>
<!ATTLIST   SETVAR NAME CDATA #IMPLIED
                VALUE CDATA #IMPLIED>
<!ELEMENT   DYNATTR (#PCDATA|VALUE)*>
<!ATTLIST   DYNATTR NAME CDATA #REQUIRED>
```

APPENDIX B

```
class BrowseCtl extends Applet
{
    init( ) {
        create and remember new browser frame;
        create and register RMI service;
    }
    start( ) { };
    nextpage( ) {
        get remembered frame;
        use Jscript call to go forward one page in history;
    }
    prevpage( ) {
        get remembered frame;
        use Jscript call to go backward one page in history;
    }
    reloadpage( ) {
        get remembered frame;
        use Jscript call to reload page;
    }
    exitbrowser( ) {
        get remembered frame;
        use Jscript call to exit Web browser;
    }
    wwwactivate( ) {
        get remembered frame;
        use Jscript call to activate web page using input
            parameters values;
    }
```

APPENDIX B-continued

```
    wwwshow( ) {
        get remembered frame;
        use Jscript call to retrieve web page using input
            parameters values;
    }
}
```

APPENDIX C

```
<?xml version="1.0"?>
<DIALOG>
<STEP NAME="init">
    <PROMPT> Task 5 Details. How would you like to proceed
    <PROMPT>
    <HELP> You may say Sign Off, Status, Repair History, Guidelines
    or Where
    <SETVAR NAME="previousDialog"
    VALUE="../TaskDetail/TaskDetail.vml#init"/
    <INPUT TYPE="optionlist" NAME="optionChosen">
        <OPTION NEXT="#signoff"> Sign Off </OPTION>
        <OPTION NEXT="#status"> Status <OR/> How am
    I Doing </OPTION>
        <OPTION NEXT="#repHist"> Repair History </OPTION>
        <OPTION NEXT="#guidelines"> Guidelines </OPTION>
        <OPTION NEXT="#exit"> Where am I <OPTION>
        <OPTION NEXT="#vizOn"> Show Me <OR/> Show </OPTION>
        <OPTION NEXT="#vizOff"> Blank Display </OPTION>
        <OPTION NEXT="#end"> Exit System </OPTION>
    </INPUT>
```

APPENDIX C-continued

```
</STEP>
<STEP NAME="signoff">
    <PROMPT> Let's sign off on Task 5 </PROMPT>
    <CANCEL NEXT="#init"/>
    <INPUT TYPE="none" NEXT="../CloseOut/CloseOut.vml#init">
    <INPUT>
</STEP>
<STEP NAME="status">
    <PROMPT> The current task is Task 5: Dismantle the shaft.
        Planned Start. Today.
        Estimated Completion Time. 2 hours. </PROMPT>
    <CANCEL NEXT="#init"/>
    <INPUT TYPE="nonell NEXT="#init">
    </INPUT>
</STEP>
<STEP NAME="repHist">
    <CANCEL NEXT="#init" />
    <INPUT TYPE="none" NEXT="../History/History.vml#init"/>
</STEP>
<STEP NAME="guidelines">
    <CANCEL NEXT="#init"/>
    <INPUT TYPE="none"
        NEXT="../Documentation/Guidelines.vml#init"/>
</STEP>
<STEP NAME="vizOn">
    <WWWSHOW SRC="../TaskDetail/TaskDetail.html"/>
    <INPUT TYPE="one" NEXT="#init" />
</STEP>
<STEP NAME="vizOff">
    <WWWSHOW SRC="../BlankPage/BlankPage.html"/>
    <INPUT TYPE="none" NEXT="#init" />
</STEP>
<STEP NAME="exit">
    <PROMPT> Task Details. Where would you like to go </PROMPT>
    <HELP> You may say Return, Task List, Personal Page or Exit
    System </HEL
    <CANCEL NEXT="#init"/>
    <INPUT TYPE="optionlist" NAME="exitOption">
        <OPTION NEXT="#init"> Return </OPTION>
        <OPTION NEXT="../TaskList/TaskList.vml#init"> Task List
        </OPTION>
        <OPTION NEXT="../PersonalPage/Personal.vml#init">
        Personal Page </Op
        <OPTION NEXT="#end"> Exit System </OPTION>
    </INPUT>
</STEP>
</DIALOG>
```

The embodiments of the invention in which an exclusive property or privilege is claimed are defined as follows:

1. A system for voice-controlled information retrieval using a voice transceiver, comprising:

a voice transceiver including a speech engine, wherein the voice transceiver is operable to execute a conversation template, the conversation template comprising a script of tagged instructions comprising voice prompts and expected user responses; and a Web browser remote from the voice transceiver, the Web browser operable to obtain information content from a network;

wherein the voice transceiver obtains and processes one or more voice commands identifying information to be retrieved by the Web browser, and wherein the voice transceiver transmits a remote method invocation requesting the identified information content to an applet process associated with the Web browser, wherein the voice transceiver transmits navigation commands for controlling navigation actions of the Web browser, wherein the applet process is configured to invoke navigation commands in the Web browser responsive to the receipt of navigation commands received from the voice transceiver; and wherein the applet process retrieves the identified information content on the Web browser responsive to the remote method invocation.

2. A system according to claim 1, further comprising:

a parser parsing the conversation template to form a set of tokens; and the voice transceiver interpreting the set of tokens.

3. A system according to claim 1, wherein the speech engine stores a dynamically compiled speech grammar in the voice transceiver, the dynamically compiled speech grammar comprising a set of voice commands, wherein the speech engine determines a speech event from a voice input device connected to the voice transceiver using the dynamically compiled speech grammar, and wherein the speech engine matches the speech event to one such voice command.

4. A system according to claim 3, further comprising:

a parser instantiating each tagged instruction; and the voice transceiver executing the instantiated tagged instruction.

5. A system according to claim 4, further comprising:

the parser organizing the set of tokens into a hierarchical structure, one such token representing a root of the hierarchical structure.

6. A system according to claim 1, wherein the speech engine stores a set of predefined voice commands, and wherein the voice transceiver performs an action responsive to a selection of one such predefined voice command.

7. The system as recited in claim 1 further comprising a telephone in communication with the voice transceiver, the telephone operable to transmit the one or more voice commands identifying information to be retrieved by the Web browser to the voice transceiver.

8. The system as recited in claim 7, wherein the telephone is a mobile telephone.

9. A process for voice-controlled information retrieval using a voice transceiver, comprising:

executing a conversation template, the conversation template comprising a script of tagged instructions comprising voice prompts and expected user responses;

processing a voice command identifying information content to be retrieved;

transmitting navigation commands for controlling navigation actions of the Web browser;

processing received navigation commands in a Web browser responsive to the receipt of navigation commands received from the voice transceiver;

sending a remote method invocation requesting the identified information content to an applet process associated with the Web browser; and retrieving the identified information content on the Web browser responsive to the remote method invocation.

10. A process according to claim 9, the operation of executing a conversation template further comprising:

parsing the conversation template to form a set of tokens; and interpreting the set of tokens.

11. A process according to claim 9, the operation of receiving a voice command further comprising:

storing a dynamically compiled speech grammar in the voice transceiver, the dynamically compiled speech grammar comprising a set of voice commands;

determining a speech event from a voice input device connected to the voice transceiver using the dynamically compiled speech grammar; and matching the speech event to one such voice command.

12. A process according to claim 11, further comprising:

instantiating each tagged instruction; and executing the instantiated tagged instruction.

13. A process according to claim 12, further comprising:

organizing the set of tokens into a hierarchical structure, one such token representing a root of the hierarchical structure.

14. A process according to claim 9, further comprising:

storing a set of predefined voice commands; and performing an action responsive to a selection of one such predefined voice command.

15. A computer-readable storage medium holding code for voice-controlled information retrieval using a voice transceiver, comprising:

a voice transceiver including a speech engine, wherein the voice transceiver is operable to execute a conversation template, the conversation template comprising a script of tagged instructions comprising voice prompts and expected user responses; and a Web browser remote from the voice transceiver, the Web browser operable to obtain information content from a network;

wherein the voice transceiver obtains and processes one or more voice commands identifying information to be retrieved by the Web browser, and wherein the voice transceiver transmits a remote method invocation requesting the identified information content to an applet process associated with the Web browser, wherein the voice transceiver is configured to transmit navigation commands for controlling navigation actions of the Web browser, wherein the applet process is configured to invoke navigation commands to in the Web browser responsive to the receipt of navigation commands received from the voice transceiver; and wherein the applet process retrieves the identified information content on the Web browser responsive to the remote method invocation.

16. A system according to claim 15, further comprising:

a parser parsing the conversation template to form a set of tokens; and the voice transceiver interpreting the set of tokens.

17. A system according to claim 15, wherein the speech engine stores a dynamically compiled speech grammar in the voice transceiver, the dynamically compiled speech grammar comprising a set of voice commands, wherein the speech engine determines a speech event from a voice input device connected to the voice transceiver using the dynamically compiled speech grammar, and wherein the speech engine matches the speech event to one such voice command.

18. A system according to claim 17, further comprising:

a parser instantiating each tagged instruction; and the voice transceiver executing the instantiated tagged instruction.

19. A system according to claim 18, further comprising:

the parser organizing the set of tokens into a hierarchical structure, one such token representing a root of the hierarchical structure.

20. A system according to claim 15, wherein the speech engine stores a set of predefined voice commands, and wherein the voice transceiver performs an action responsive to a selection of one such predefined voice command.

21. A system for retrieving Web content onto a browser running on a remote client using a voice transceiver, comprising:

a storage device storing a conversation template on a server, the conversation template comprising a script including instruction tags for voice commands and voice prompts;

a voice transceiver receiving the conversation template and including:

a parser parsing the instruction tags from the script to form a set of interrelated tokens and instantiating an object corresponding to each token;

an interpreter interpreting the set of tokens by executing the object instance corresponding to each token; and a speech engine receiving a voice command on the voice transceiver from a user, wherein the voice transceiver is operable to send a remote invocation identifying Web content to be retrieved, wherein the voice transceiver is operable to send navigation commands to modify the content communicated by the browser; and a remote client interconnected to the server and the voice transceiver via a network, the remote client including an applet associated with the browser running on the remote client, the applet operable to request Web content from the server responsive to the remote method invocation, and wherein the applet is operable to invoke navigation commands on the browser upon receipt of at least one navigation command.

22. A system according to claim 21, further comprising:

the storage device further comprising storing a document type definition defining a format for the script and acceptable instruction tags; and the parser further comprising a module parsing the script further comprising validating each instruction tag against the document type definition.

23. A system according to claim 22, wherein each object instance includes an accessor method, the interpreter further comprises:

a module determining those tokens related to each such token by performing the accessor method associated with the token; and a module interpreting the set of related tokens.

24. A system according to claim 23, wherein at least one such token comprises a branch instruction token, the interpreter further comprises:

a module interrupting the operation of executing the related tokens upon the execution of the branch instruction token; and a module determining those tokens related to the branch instruction token by performing the accessor method associated with the branch instruction token.

25. A system according to claim 21, wherein the parser further comprises:

a module building a parse tree of the set of tokens, each such token representing a leaf in the parse tree and corresponding to an instruction tag in the script in the received conversation template.

26. A system according to claim 25, wherein the interpreter further comprises:

a module performing a depth first traversal of the parse tree following execution of an object instance corresponding to a non-terminal leaf in the parse tree.

27. A process for retrieving Web content onto a browser running on a remote client using a voice transceiver, the remote client and the voice transceiver both interconnected to a server via a network, comprising:

storing a conversation template on the server, the conversation template comprising a script including instruction tags for voice commands and voice prompts;

receiving the conversation template on the voice transceiver;

parsing the instruction tags from the script to form a set of interrelated tokens and instantiating an object corresponding to each token;

interpreting the set of tokens by executing the object instance corresponding to each token;

receiving a voice command on the voice transceiver from a user;

if said voice command contains data indicative of a request for Web content, sending a remote method invocation identifying the Web content to an applet associated with the browser running on the remote client, requesting the Web content from the server responsive to the remote method invocation, and receiving the Web content on the browser; and if said voice command contains data indicative of a navigation command, sending the navigation command to the applet associated with the browser to request the browser to modify the content communicated by the browser.

28. A process according to claim 27, further comprising:

providing a document type definition defining a format for the script and acceptable instruction tags; and the operation of parsing the script further comprising validating each instruction tag against the document type definition.

29. A process according to claim 28, wherein each object instance includes an accessor method, the operation of interpreting the set of tokens further comprising:

determining those tokens related to each such token by performing the accessor method associated with the token; and interpreting the set of related tokens.

30. A process according to claim 29, wherein at least one such token comprises a branch instruction token, the operation of executing the related tokens further comprising:

interrupting the operation of executing the related tokens upon the execution of the branch instruction token; and determining those tokens related to the branch instruction token by performing the accessor method associated with the branch instruction token.

31. A process according to claim 27, wherein the operation of parsing the script further comprises:

building a parse tree of the set of tokens, each such token representing a leaf in the parse tree and corresponding to an instruction tag in the script in the received conversation template.

32. A process according to claim 31, wherein the operation of interpreting the parse tree further comprises:

performing a depth first traversal of the parse tree following execution of an object instance corresponding to a non-terminal leaf in the parse tree.

33. A computer-readable storage medium holding code for retrieving Web content onto a browser running on a remote client using a voice transceiver, the remote client and the voice transceiver both interconnected to a server via a network, comprising:

storing a conversation template on the server, the conversation template comprising a script including instruction tags for voice commands and voice prompts;

receiving the conversation template on the voice transceiver;

parsing the instruction tags from the script to form a set of interrelated tokens and instantiating an object corresponding to each token;

interpreting the set of tokens by executing the object instance corresponding to each token;

receiving a voice command on the voice transceiver from a user;

if said voice command contains data indicative of a request for Web content, sending a remote method invocation identifying the Web content to an applet associated with the browser running on the remote client, requesting the Web content from the server responsive to the remote method invocations, and receiving the Web content on the browser;

if said voice command contains data indicative of a navigation command, sending the navigation command to the applet associated with the browser to request the browser to modify the content communicated by the browser.

34. A storage medium according to claim 33, further comprising:

providing a document type definition defining a format for the script and acceptable instruction tags; and the operation of parsing the script further comprising validating each instruction tag against the document type definition.

35. A storage medium according to claim 34, wherein each object instance includes an accessor method, the operation of interpreting the set of tokens further comprising:

determining those tokens related to each such token by performing the accessor method associated with the token; and interpreting the set of related tokens.

36. A storage medium according to claim 35, wherein at least one such token comprises a branch instruction token, the operation of executing the related tokens further comprising:

interrupting the operation of executing the related tokens upon the execution of the branch instruction token; and determining those tokens related to the branch instruction token by performing the accessor method associated with the branch instruction token.

37. A storage medium according to claim 33, wherein the operation of parsing the script further comprises:

building a parse tree of the set of tokens, each such token representing a leaf in the parse tree and corresponding to an instruction tag in the script in the received conversation template.

38. A storage medium according to claim 37, wherein the operation of interpreting the parse tree further comprises:

performing a depth first traversal of the parse tree following execution of an object instance corresponding to a non-terminal leaf in the parse tree.

\* \* \* \* \*